(12) United States Patent
Horn et al.

(10) Patent No.: US 11,736,326 B2
(45) Date of Patent: Aug. 22, 2023

(54) MODULATED DOWNLINK REFERENCE SIGNAL FOR LOW POWER OPERATIONS

(71) Applicant: QUALCOMM Incorporated, San Diego, CA (US)

(72) Inventors: Idan Michael Horn, Hod Hasharon (IL); Amit Bar-Or Tillinger, Tel-Aviv (IL); Shay Landis, Hod Hasharon (IL); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 17/334,026

(22) Filed: May 28, 2021

(65) Prior Publication Data

US 2022/0385507 A1    Dec. 1, 2022

(51) Int. Cl.
*H04L 27/26*        (2006.01)
*H04L 5/00*         (2006.01)
*H04B 17/336*       (2015.01)
*H04W 52/02*        (2009.01)
*H04W 72/23*        (2023.01)

(52) U.S. Cl.
CPC ......... *H04L 27/261* (2013.01); *H04B 17/336* (2015.01); *H04L 5/0048* (2013.01); *H04W 52/0277* (2013.01); *H04W 72/23* (2023.01)

(58) Field of Classification Search
CPC ... H04L 27/261; H04L 5/0048; H04B 17/336; H04W 52/0277; H04W 72/042
See application file for complete search history.

(56) References Cited

U.S. PATENT DOCUMENTS

| 2010/0026383 | A1* | 2/2010 | Ahrari | H04L 25/061 327/551 |
| 2014/0313994 | A1* | 10/2014 | Su | H04L 1/0041 370/329 |
| 2019/0207722 | A1* | 7/2019 | Gao | H04B 7/088 |
| 2019/0245646 | A1* | 8/2019 | Robert Safavi | H04L 1/0061 |

* cited by examiner

*Primary Examiner* — Minh Trang T Nguyen

(74) *Attorney, Agent, or Firm* — Danai Nelisile Mhembere; Holland & Hart LLP

(57) ABSTRACT

Methods, systems, and devices for wireless communication are described. A communication device may receive control signaling indicating a downlink reference signal configuration, for example, a demodulation reference signal (DMRS) configuration. The communication device may receive a downlink reference signal (e.g., a DMRS) over a downlink control channel (e.g., a physical downlink control channel (PDCCH)) during an initial symbol duration of a transmission time interval (TTI). The downlink reference signal may include a set of bits including a first subset of bits including network temporary identifier bits and a second subset of bits including constellation bits associated with a downlink data channel (e.g., a physical downlink shared channel (PDSCH)). The communication device may process the downlink reference signal (e.g., a DMRS) based on the downlink reference signal configuration (e.g., a DMRS configuration).

30 Claims, 18 Drawing Sheets

MODULATED DOWNLINK REFERENCE SIGNAL FOR LOW POWER OPERATIONS

FIELD OF TECHNOLOGY

The following relates to wireless communication, including modulated downlink reference signals associated with the wireless communication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

Various aspects of the present disclose relate to modulating downlink reference signals for low power operations. A UE may receive control signaling, such a radio resource control (RRC) message, a downlink control information (DCI), or a medium access control-control element (MAC-CE) that indicates a downlink reference signal configuration. The UE may receive a downlink reference signal during a first symbol duration of a transmission time interval (TTI) (e.g., a slot). The downlink reference signal may include a set of bits, which may indicate one or more of a radio network temporary identifier (RNTI) and a downlink data channel constellation which may correspond to a physical downlink shared channel (PDSCH) message. The UE may decode the downlink reference signal based on the downlink reference signal configuration. The described techniques may enable the UE to perform low power operations with greater processing efficiency and lower power consumption, among other benefits.

A method for wireless communication at a UE is described. The method may include receiving control signaling indicating a downlink reference signal configuration, receiving a downlink reference signal over a downlink control channel during an initial symbol duration of a TTI, the downlink reference signal including a set of bits including a first subset of bits including network temporary identifier bits and a second subset of bits including constellation bits associated with a downlink data channel, and processing the downlink reference signal based on the downlink reference signal configuration.

An apparatus for wireless communication at a UE is described. The apparatus may include a processor, memory coupled with the processor, and instructions stored in the memory. The instructions may be executable by the processor to cause the apparatus to receive control signaling indicating a downlink reference signal configuration, receive a downlink reference signal over a downlink control channel during an initial symbol duration of a TTI, the downlink reference signal including a set of bits including a first subset of bits including network temporary identifier bits and a second subset of bits including constellation bits associated with a downlink data channel, and process the downlink reference signal based on the downlink reference signal configuration.

Another apparatus for wireless communication at a UE is described. The apparatus may include means for receiving control signaling indicating a downlink reference signal configuration, means for receiving a downlink reference signal over a downlink control channel during an initial symbol duration of a TTI, the downlink reference signal including a set of bits including a first subset of bits including network temporary identifier bits and a second subset of bits including constellation bits associated with a downlink data channel, and means for processing the downlink reference signal based on the downlink reference signal configuration.

A non-transitory computer-readable medium storing code for wireless communication at a UE is described. The code may include instructions executable by a processor to receive control signaling indicating a downlink reference signal configuration, receive a downlink reference signal over a downlink control channel during an initial symbol duration of a TTI, the downlink reference signal including a set of bits including a first subset of bits including network temporary identifier bits and a second subset of bits including constellation bits associated with a downlink data channel, and process the downlink reference signal based on the downlink reference signal configuration.

Some examples of the method, apparatuses, and non-transitory computer-readable medium described herein may further include operations, features, means, or instructions for setting a resolution for an analog-to-digital converter (ADC) associated with the UE based on processing the downlink reference signal, where the set of bits includes a third subset of bits including ADC bits associated with the resolution for the ADC.

In some examples of the method, apparatuses, and non-transitory computer-readable medium described herein, receiving the downlink reference signal may include operations, features, means, or instructions for receiving a modulated downlink reference signal over the downlink control channel during the initial symbol duration of the TTI and where the modulated downlink reference signal includes a set of modulated bits including the first subset of bits and the second subset of bits.

Some examples of the method, apparatuses, and non-transitory computer-readable medium described herein may further include operations, features, means, or instructions for demodulating the modulated downlink reference signal based on the downlink reference signal configuration and where processing the downlink reference signal may be based on demodulating the modulated downlink reference signal.

Some examples of the method, apparatuses, and non-transitory computer-readable medium described herein may further include operations, features, means, or instructions for descrambling the downlink reference signal based on a descrambling sequence, a most significant bit of the descrambling sequence corresponds to the first subset of bits and a least significant bit corresponds to the second subset of bits and where processing the downlink reference signal may be based on descrambling the downlink reference signal.

Some examples of the method, apparatuses, and non-transitory computer-readable medium described herein may further include operations, features, means, or instructions for receiving a downlink message on the downlink data channel during a symbol duration after the initial symbol duration of the TTI based on processing the downlink reference signal, where the downlink data channel includes a PDSCH.

In some examples of the method, apparatuses, and non-transitory computer-readable medium described herein, the downlink reference signal may be scrambled based on a noncoherent waveform.

Some examples of the method, apparatuses, and non-transitory computer-readable medium described herein may further include operations, features, means, or instructions for transmitting UE capability information and where receiving the downlink reference signal over the downlink control channel during the initial symbol duration of the TTI may be based on the UE capability information.

Some examples of the method, apparatuses, and non-transitory computer-readable medium described herein may further include operations, features, means, or instructions for transmitting a battery status report including an indication of one or more of a rate of power consumption, a percentage of a total battery power remaining, or an allocation of a battery usage and where receiving the downlink reference signal over the downlink control channel during the initial symbol duration of the TTI may be based on the battery status report.

Some examples of the method, apparatuses, and non-transitory computer-readable medium described herein may further include operations, features, means, or instructions for determining a signal-to-noise ratio (SNR) associated with the downlink reference signal and where receiving the downlink reference signal over the downlink control channel during the initial symbol duration of the TTI may be based on the SNR associated with the downlink reference signal satisfying a threshold.

In some examples of the method, apparatuses, and non-transitory computer-readable medium described herein, the first subset of bits including the network temporary identifier bits includes at least a portion of a network temporary identifier corresponding to the UE.

Some examples of the method, apparatuses, and non-transitory computer-readable medium described herein may further include operations, features, means, or instructions for determining a UE search space associated with the downlink control channel based on the downlink reference signal configuration, the UE search space corresponding to one or more of a number of candidate downlink control channel locations in a control resource set (CORESET) or a number of constellations and where receiving the downlink reference signal may be based on the UE search space.

In some examples of the method, apparatuses, and non-transitory computer-readable medium described herein, the downlink reference signal includes a demodulation reference signal (DMRS).

In some examples of the method, apparatuses, and non-transitory computer-readable medium described herein, the downlink control channel includes a physical downlink control channel (PDCCH) and the downlink data channel includes a PDSCH.

In some examples of the method, apparatuses, and non-transitory computer-readable medium described herein, the initial symbol duration includes an OFDM symbol.

A method for wireless communication at a base station is described. The method may include transmitting control signaling to a UE, the control signaling indicating a downlink reference signal configuration and transmitting a downlink reference signal to the UE over a downlink control channel during an initial symbol duration of a TTI, the downlink reference signal including a set of bits including a first subset of bits including network temporary identifier bits and a second subset of bits including constellation bits associated with a downlink data channel.

An apparatus for wireless communication at a base station is described. The apparatus may include a processor, memory coupled with the processor, and instructions stored in the memory. The instructions may be executable by the processor to cause the apparatus to transmit control signaling to a UE, the control signaling indicating a downlink reference signal configuration and transmit a downlink reference signal to the UE over a downlink control channel during an initial symbol duration of a TTI, the downlink reference signal including a set of bits including a first subset of bits including network temporary identifier bits and a second subset of bits including constellation bits associated with a downlink data channel.

Another apparatus for wireless communication at a base station is described. The apparatus may include means for transmitting control signaling to a UE, the control signaling indicating a downlink reference signal configuration and means for transmitting a downlink reference signal to the UE over a downlink control channel during an initial symbol duration of a TTI, the downlink reference signal including a set of bits including a first subset of bits including network temporary identifier bits and a second subset of bits including constellation bits associated with a downlink data channel.

A non-transitory computer-readable medium storing code for wireless communication at a base station is described. The code may include instructions executable by a processor to transmit control signaling to a UE, the control signaling indicating a downlink reference signal configuration and transmit a downlink reference signal to the UE over a downlink control channel during an initial symbol duration of a TTI, the downlink reference signal including a set of bits including a first subset of bits including network temporary identifier bits and a second subset of bits including constellation bits associated with a downlink data channel.

Some examples of the method, apparatuses, and non-transitory computer-readable medium described herein may further include operations, features, means, or instructions for modulating the downlink reference signal based on the downlink reference signal configuration, where the modulated downlink reference signal includes a set of modulated bits including the first subset of bits and the second subset of bits, where transmitting the downlink reference signal includes and transmitting the modulated downlink reference signal to the UE over the downlink control channel during the initial symbol duration of the TTI.

Some examples of the method, apparatuses, and non-transitory computer-readable medium described herein may further include operations, features, means, or instructions for scrambling the downlink reference signal based on a scrambling sequence, a most significant bit of the scrambling sequence corresponds to the first subset of bits and a least significant bit corresponds to the second subset of bits.

Some examples of the method, apparatuses, and non-transitory computer-readable medium described herein may further include operations, features, means, or instructions for transmitting a downlink message on the downlink data channel during a symbol duration after the initial symbol duration of the TTI based on processing the downlink reference signal and where the downlink data channel includes a PDSCH.

In some examples of the method, apparatuses, and non-transitory computer-readable medium described herein, the downlink reference signal may be scrambled based on a noncoherent waveform.

Some examples of the method, apparatuses, and non-transitory computer-readable medium described herein may further include operations, features, means, or instructions for receiving UE capability information and where transmitting the downlink reference signal to the UE over the downlink control channel during the initial symbol duration of the TTI may be based on the UE capability information.

Some examples of the method, apparatuses, and non-transitory computer-readable medium described herein may further include operations, features, means, or instructions for receiving a battery status report including an indication of one or more of a rate of power consumption, a percentage of a total battery power remaining, or an allocation of a battery usage and where transmitting the downlink reference signal to the UE over the downlink control channel during the initial symbol duration of the TTI may be based on the battery status report.

Some examples of the method, apparatuses, and non-transitory computer-readable medium described herein may further include operations, features, means, or instructions for determining a SNR associated with the downlink reference signal and where transmitting the downlink reference signal to the UE over the downlink control channel during the initial symbol duration of the TTI may be based on the SNR satisfying a threshold.

In some examples of the method, apparatuses, and non-transitory computer-readable medium described herein, the first subset of bits including the network temporary identifier bits includes at least a portion of a network temporary identifier corresponding to the UE.

In some examples of the method, apparatuses, and non-transitory computer-readable medium described herein, the downlink reference signal includes a DMRS.

In some examples of the method, apparatuses, and non-transitory computer-readable medium described herein, the downlink control channel includes a PDCCH and the downlink data channel includes a PDSCH.

In some examples of the method, apparatuses, and non-transitory computer-readable medium described herein, the initial symbol duration includes an OFDM symbol.

DETAILED DESCRIPTION

Figure 1:
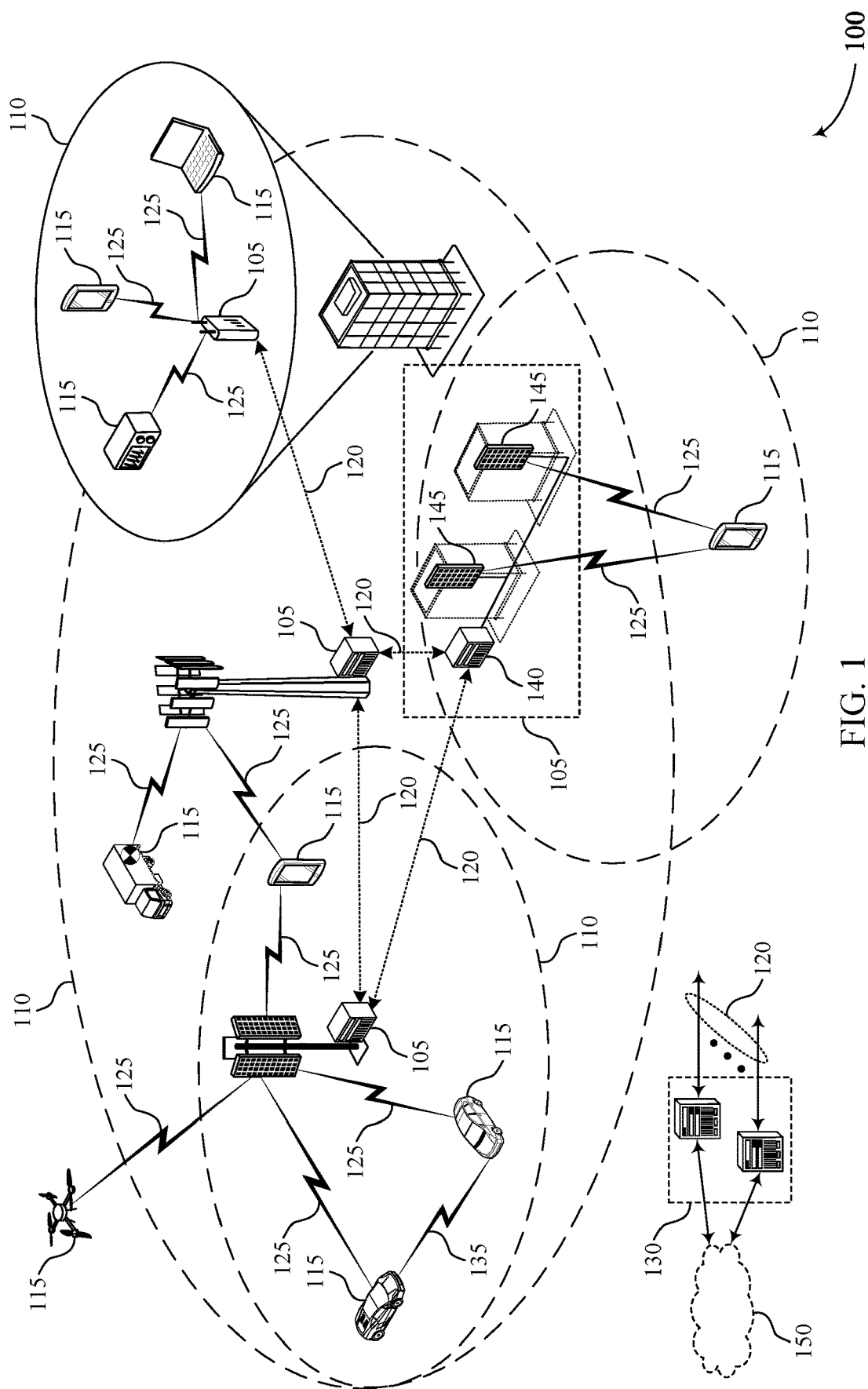
FIGS. 1 and 2 illustrate examples of wireless communications systems in accordance with aspects of the present disclosure.

Some wireless communications systems may include communication devices, such as a UE or a base station (for example, an eNodeB (eNB), a next-generation NodeB or a giga-NodeB, any of which may be referred to as a gNB, or some other base station), that may support multiple radio access technologies. Examples of radio access technologies include 4G systems, such as LTE systems, and 5G systems, which may be referred to as NR systems. A UE may operate in a low power mode. While operating in the low power mode, the UE may periodically wake up to monitor a downlink control channel, such as a PDCCH, which may carry a DCI. The DCI may include a grant indicating a resource allocation of a downlink data channel, such as a PDSCH.

The UE may obtain the DCI by monitoring a CORESET during a duration (such as a downlink decoding occasion) in which the UE wakes up according to the low power mode. For example, the UE may wake up during a respective downlink decoding occasion and may perform blind decoding in candidate downlink control channel locations of a search space. Prior to performing the blind decoding, the UE may receive a downlink reference signal (e.g., a demodulation reference signal (DMRS)), which may be used to enable the blind decoding of the downlink control channel (e.g., the PDCCH). In some cases, processing the downlink reference signal and then blind decoding the downlink control channel may result in extended latency and excessive power consumption at the UE.

Various aspects of the present disclosure relate to reducing the latency and power consumption associated with processing the downlink reference signal and then blind decoding the downlink control channel. The downlink reference signal may carry constellation information for the PDSCH transmission. That is, the downlink reference signal may indicate to the UE whether there is a pending PDSCH transmission for the UE. For example, if the UE demodulates the downlink reference signal and determines that the UE is not intended to receive a PDSCH transmission, the UE may skip the blind decoding and return to sleep without monitoring subsequent downlink decoding occasions. The constellation received in the downlink reference signal may indicate to the UE information associated with the resolution of an analog-to-digital converter (ADC) at the UE (e.g., the number of ADC bits used to process the downlink reference signal). The identification of the ADC resolution associated with processing the downlink reference signal may decrease the overall time the UE may be in an awake mode, thus decreasing the overall power consumption at the UE.

Aspects of the present disclosure may be implemented to realize one or more of the following advantages. The described techniques may provide for reduced power consumption at a UE based on receiving a downlink reference signal and using the downlink reference signal to selectively monitor a downlink channel for messages from a base station (e.g., a PDSCH transmission). For example, the described techniques may enable the UE to determine whether the base station is scheduled to transmit any downlink messages to the UE based on the downlink reference signal. If the UE is not scheduled to receive any downlink messages from the base station, the UE may enter a sleep mode. As a result, the UE may experience reduced power consumption and improved battery life, among other benefits. Otherwise, if the UE is scheduled to receive any downlink messages from the base station, the UE may use the downlink data channel constellation to set an ADC resolution at the UE. As a result, the UE may operate with a greater processing efficiency, among other benefits.

Aspects of the disclosure are initially described in the context of wireless communications systems. Aspects of the disclosure are further illustrated by and described with reference to apparatus diagrams, system diagrams, and flowcharts that relate to modulated downlink reference signals for low power operations.

FIG. 1 illustrates an example of a wireless communications system 100 in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or a NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs. The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation. A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

A UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, in the wireless communications system 100, a UE 115 may experience relatively high power consumption while operating in some sub-THz frequency ranges (e.g., a frequency range 4 (FR4), a frequency range 5 (FR5)). These frequency ranges may be associated with relatively higher throughput levels and relatively higher pathloss values. As such, the UE 115 may consume a relatively large amount of power while using one or more antenna elements, analog digital converters (ADCs), or digital-front-end (DFE) to perform baseband processing operations in such frequency ranges. To reduce power consumption and improve power efficiency, the UE 115 may enter a sleep mode and may periodically wake from the sleep mode to monitor a downlink channel for downlink messages (e.g., PDCCH transmissions).

The UE 115 may wake up at a beginning of a transmission time interval (TTI) (e.g., a slot) to monitor for downlink messages from a base station 105. In some cases, the UE 115 may be unable to determine if the base station 105 has allocated PDCCH resources to the UE 115 (e.g., if the UE 115 is scheduled to receive any PDCCH transmissions from the base station 105). That is, the UE 115 may continuously monitor the downlink channel for the entire slot, even if the UE 115 is not scheduled to receive a downlink message from the base station 105. Blindly searching PDCCH candidates (e.g., hypotheses) when the UE 115 is not scheduled to receive any downlink messages (e.g., performing a false wakeup) may result in excessive power consumption at the UE 115.

Other methods for power saving at the UE 115 may include using the modulation and coding scheme (MCS) acquired from the base station 105. For example, the base station 105 may transmit an MCS to the UE 115 via control signaling (e.g., an RRC message, a DCI, a MAC-CE, etc.) which the UE 115 may use for calibration of the ADC resolution (e.g., number of ADC bits) used for decoding various reference signals. By using the MCS to calibrate the ADC resolution, the UE 115 may reduce the baseband power consumption at the UE 115.

In the wireless communications system 100, a UE 115 may receive, from a base station 105, control signaling, such an RRC message, a DCI, or a MAC-CE that indicates a downlink reference signal configuration. In some examples, the UE 115 may receive in one or more of an RRC message, a DCI, or a MAC-CE a DMRS configuration. The UE 115 may receive, from the base station 105, a downlink reference signal (e.g., a DMRS) during an initial symbol duration of a TTI (e.g., a slot). In some examples, the downlink reference signal may be modulated with a set of modulated bits. For example, a DMRS may include a set of bits, which may indicate one or more of a RNTI and a PDSCH constellation.

The DMRS may indicate to the UE 115 whether there is a pending PDSCH transmission for the UE 115. The UE 115 may decode the downlink reference signal based on the downlink reference signal configuration. If the UE 115 demodulates the downlink reference signal and determines that the UE 115 is not intended to receive a PDSCH transmission, the UE 115 may skip the blind decoding and return to sleep without monitoring subsequent downlink decoding occasions. For example, a modulation scheme may be used by the base station 105 to generate bits for PDSCH transmissions based on constellation points of a constellation map (e.g., QPSK, QAM, etc.). The constellation bits may correspond to constellation points of the constellation map for PDSCH transmissions. As such, when the UE 115 receives the constellation bits it can determine whether there is an upcoming PDSCH transmission based on the a correspondence between the constellation bits and constellation points of a constellation map for PDSCH transmissions. The described techniques may enable the UE to perform low power operations with greater processing efficiency and lower power consumption, among other benefits.

Figure 2:
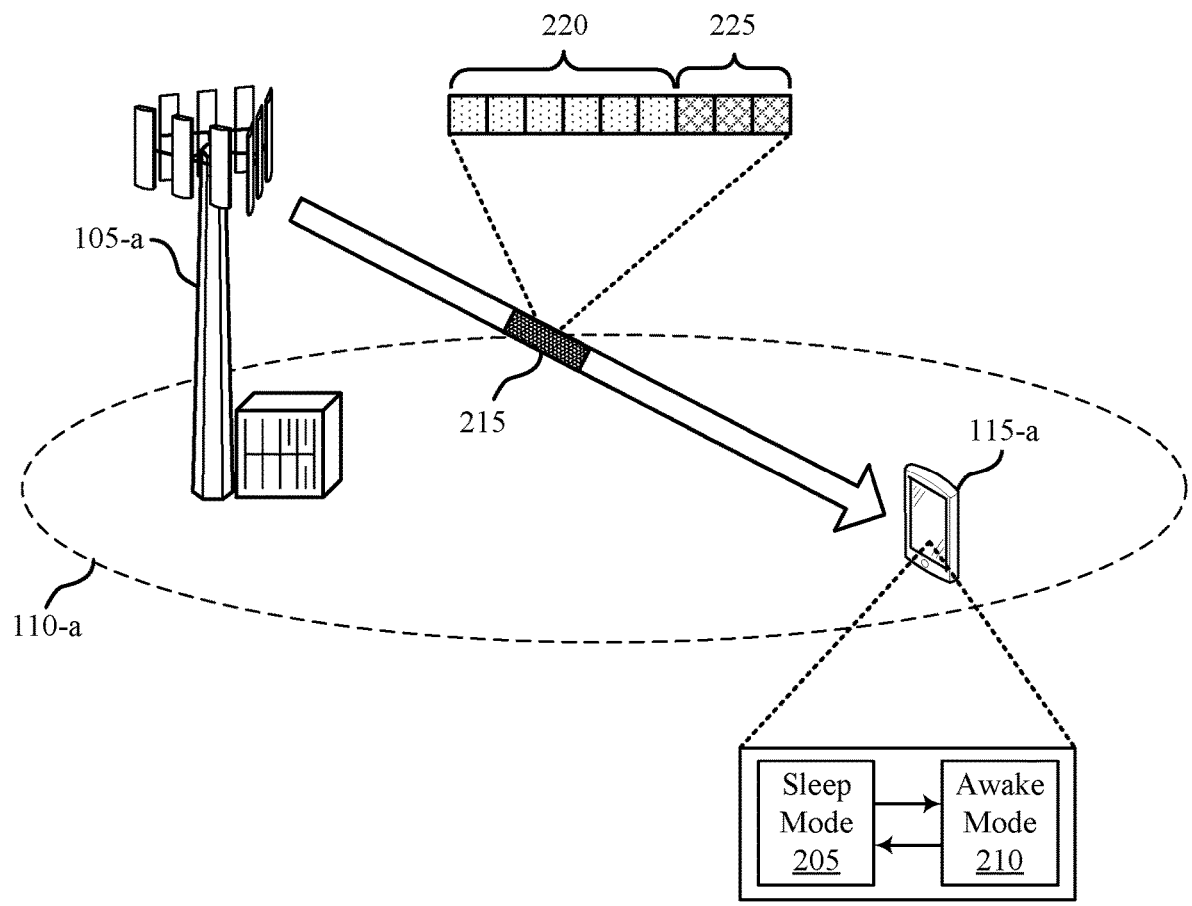
Figure 2:

FIG. 2 illustrates an example of a wireless communications system 200 in accordance with aspects of the present disclosure. In some cases, the wireless communications system 200 may implement aspects of wireless communications system 100. The wireless communications system 200 may implement aspects of the wireless communications system 100 or may be implemented by aspects of the wireless communications system 100 as described with reference to FIG. 1. For example, the wireless communications system 200 may include a base station 105-*a* and a UE 115-*a*, which may be examples of corresponding devices as described with reference to FIG. 1.

In the example of FIG. 2, the UE 115-*a* may enter a sleep mode 205 (e.g., to reduce power consumption) and may periodically transition to an awake mode 210 to monitor a downlink channel (e.g., a PDCCH) during a PDCCH decoding occasion. In some cases, the PDCCH decoding occasion may have a duration of up to three symbol durations, but may be longer (e.g., up to six symbol durations) due to decoding latency at the UE 115-*a*. In such cases, the UE 115-*a* may be configured to continuously monitor the downlink channel for the entire PDCCH decoding occasion. That is, one or more radio frequency (RF) chains and DFE chains at the UE 115-*a* may be active for the entire PDCCH decoding occasion. Additionally, the RF chains and DFE chains may be configured with a highest accuracy setting. As a result, the RF and DFE chains may consume a relatively high amount of power while the UE 115-*a* is monitoring the downlink channel.

During the PDCCH decoding occasion, the UE 115-*a* may monitor the downlink channel for messages from the base station 105-*a*. In some cases, the UE 115-*a* may not be scheduled to receive a message from the base station 105-*a*. As such, continuously monitoring the downlink channel for the entire PDCCH decoding occasion may result in excessive power consumption at the UE 115-*a*. In addition, the one or more UEs 115 connected to the base station 105-*a* may be unable to determine which (if any) of the one or more UEs 115 are scheduled to receive downlink messages from the base station 105-*a* during the PDCCH decoding occasion. As such, the UE 115-*a* may blindly monitor the downlink channel, which may result in higher power consumption and reduced processing efficiency at the UE 115-*a*.

In the wireless communications system 200, the base station 105-*a* may transmit a downlink reference signal 215 (e.g., a modulated DMRS) to the UE 115-*a*. The downlink reference signal 215 may include a set of RNTI bits 220, which may be used to identify which UE (e.g., the UE 115-*a*) the downlink reference signal 215 is intended for, and a set of constellation bits 225 (e.g., a downlink data channel constellation). In some cases, the set of constellation bits 225 received in the downlink reference signal 215 may indicate to the UE 115-*a* information associated with the resolution of the ADC at the UE 115-*a*. For example, the set of constellation bits 225 may indicate to the UE 115-*a* a number of ADC bits used to process the downlink reference signal 215. In some examples, the UE 115-*a* may reference a data structure (e.g., a table) that maps the set of constellation bits 225 to the number of ADC bits, which indicate the resolution of the ADC. In some examples, the UE 115 may receive a configuration (e.g., via an RRC configuration, or a DCI), which may include the data structure identifying a correspondence (e.g., mapping) between constellation bits and ADC bits for setting a resolution of the ADC.

The UE 115-*a* may perform downlink channel monitoring with greater processing efficiency and lower power consumption based on the downlink reference signal 215. For example, the downlink reference signal 215 may carry a set of constellation bits 225. That is, the set of constellation bits 225 included in the downlink reference signal 215 may indicate to the UE 115-*a* whether there is a pending PDSCH transmission for the UE 115-*a*. If, for example, the set of constellation bits 225 indicates that the UE 115-*a* is not intended to receive a PDSCH transmission, the UE 115-*a* may skip blind decoding the PDCCH and transition from the awake mode 210 to the sleep mode 205 without monitoring subsequent downlink decoding occasions.

The set of constellation bits 225 received in the downlink reference signal 215 may indicate to the UE 115-*a* information associated with the resolution of an ADC at the UE 115-*a*. That is, the set of constellation bits 225 may indicate the number of ADC bits used to process the downlink reference signal 215. The identification of the ADC resolution associated with processing the downlink reference signal 215 may decrease the overall time that the UE 115-*a* may be in the awake mode 210, thus decreasing the overall power consumption at the UE 115-*a*. In some cases, the base station 105-*a* may include the set of constellation bits 225 in the downlink reference signal 215 for UEs 115 that have indicated a configurable ADC support capability. For example, the UE 115-a may report an ADC support capability to the base station 105-a, indicating to the base station 105-a that the UE 115-a includes the configurable ADC support capability. The set of RNTI bits 220 may enable allocation signaling to multiple UEs 115 in the wireless communications system 200. Each RNTI bit of the set of RNTI bits 220 may correspond to a respective UE 115 of a group of UEs 115. For example, a RNTI bit of set of RNTI bits 220 may correspond to the UE 115-a connected to the base station 105-a.

In some examples, the downlink reference signal 215 may be a scrambled downlink reference signal with a non-coherent waveform. In some examples, the UE 115-a may descramble the downlink reference signal 215 by using a descrambling sequence which may reduce the latency of the PDCCH decoding and thus may reduce the amount of time the UE 115-a is in the awake mode 210. In some cases, the scrambling sequence may include the set of RNTI bits 220, which may correspond to a most significant bit (MSB) of the descrambling sequence and information associated with the set of constellation bits 225 which may correspond to a least significant bit (LSB) of the descrambling sequence. The transmission of the downlink reference signal 215 as a scrambled downlink reference signal with a non-coherent waveform is described in more detail herein, including with reference to FIG. 3.

In some other examples, the downlink reference signal 215 may be a modulated downlink reference signal. For example, the modulated downlink reference signal may include information relating to the set of RNTI bits 220 associated with the UE 115-a and information relating to the set of constellation bits 225. In cases where the downlink reference signal 215 is modulated, the set of constellation bits 225 may be carried un-precoded with repetition. The transmission of the downlink reference signal 215 as a modulated downlink reference signal is described in more detail herein, including with reference to FIG. 3.

Using the downlink reference signal 215 to determine whether the UE 115-a is scheduled to receive any downlink messages from the base station 105-a (e.g., based on identifying an existence or non-existence of downlink resource allocation for the UE 115-a) may enable the UE 115-a to experience reduced power consumption and longer battery life, among other benefits. For example, if the UE 115-a determines that the base station 105-a is not scheduled to transmit a downlink message to the UE 115-a during the PDCCH decoding occasion (e.g., based on decoding the downlink reference signal 215), the UE 115-a may deactivate (e.g., shut down) a radio frequency integrated circuit (RFIC) of the UE 115-a, which may reduce power consumption at the UE 115-a. In addition, determining the ADC resolution (e.g., number of ADC bits) may enable the UE 115-a to operate with greater processing efficiency, among other benefits.

Figure 3:
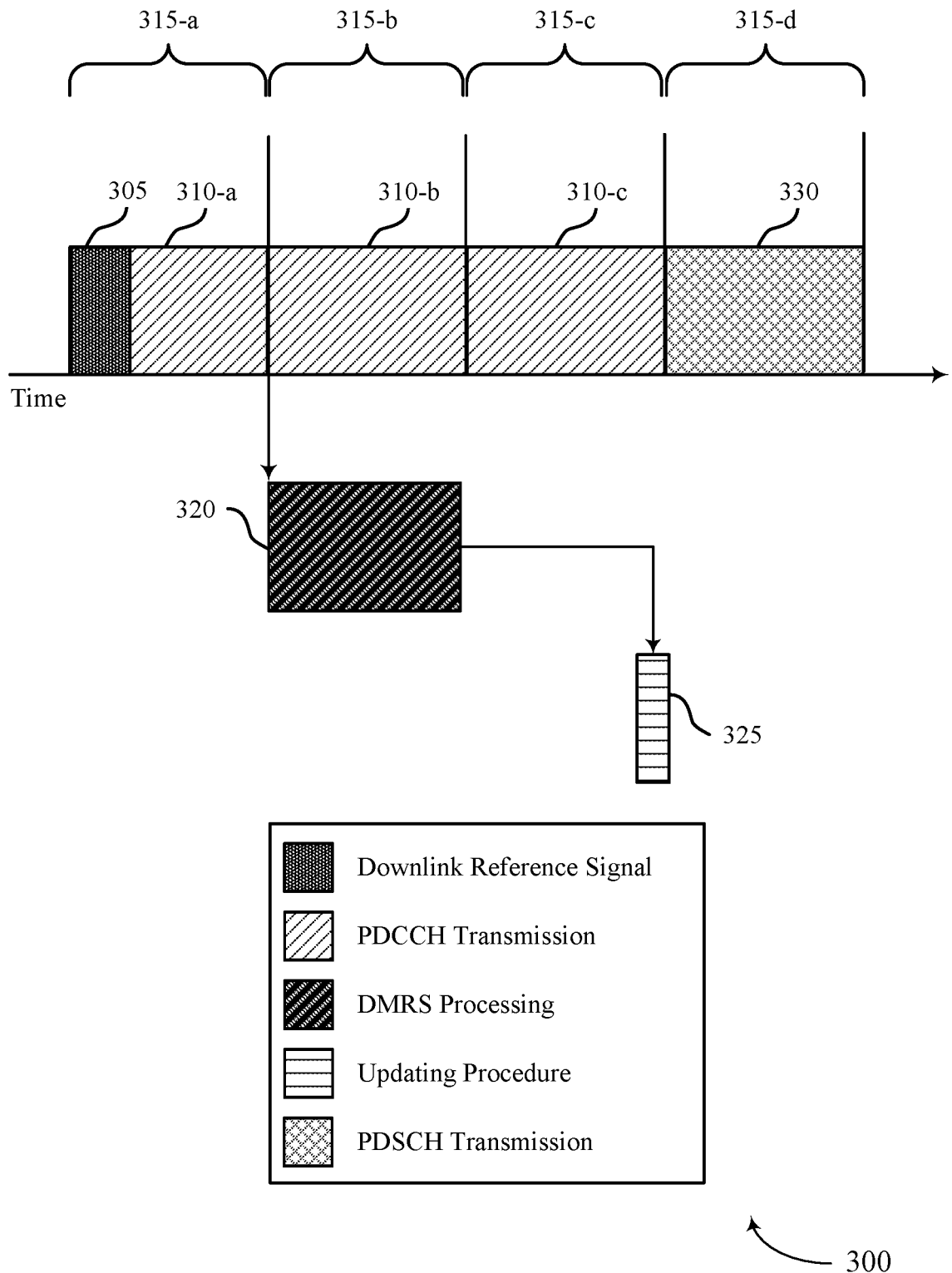
FIG. 3 illustrates an example of a timeline in accordance with aspects of the present disclosure.

FIG. 3 illustrates an example of a timeline 300 in accordance with aspects of the present disclosure. The timeline 300 may implement aspects of the wireless communications systems 100 and 200 or may be implemented by aspects of the wireless communications systems 100 and 200 as described with reference to FIGS. 1 and 2. For example, the timeline 300 may be implemented by a UE 115 and a base station 105, which may be examples of corresponding devices described with reference to FIGS. 1 and 2.

In the example of FIG. 3, a base station 105 may transmit and a UE 115 may receive one or more downlink transmissions during one or more symbol durations 315, such as a symbol duration 315-a, a symbol duration 315-b, a symbol duration 315-c, or a symbol duration 315-d. Each of the one or more symbol durations may an OFDM symbol. A base station 105 may transmit a downlink reference signal 305 to a UE 115 during a symbol duration 315-a. The base station 105 may transmit the downlink reference signal 305 via a PDCCH transmission 310 (e.g., a PDCCH transmission 310-a) during the symbol duration 315-a. In some examples, the base station 105 may transmit the downlink reference signal 305 to the UE 115 based on the UE 115 waking up from a sleep mode and monitoring a downlink control channel (e.g., a PDCCH) during a downlink decoding occasion.

In some cases, the downlink reference signal 305 received based on the PDCCH transmission 310-a may be a scrambled downlink reference signal with a non-coherent waveform. The scrambling downlink reference signal sequence may be used for an improved resource allocation detection when compared to a non-scrambled downlink reference signal. For example, in cases in which the base station 105 does not transmit an allocation to the UE 115, the UE 115 may shut down the RF at the UE 115 based on the correlation with a scrambling hypothesis, which may reduce latency of the downlink control channel decoding and thereby reduce the open duration of the RF. The UE 115 may descramble the scrambled downlink reference signal by using a descrambling sequence which may be preconfigured at the UE 115.

The scrambled downlink reference signal may include a set of bits that may indicate one or more intended UEs 115 as well as information relating to a downlink shared channel constellation. For example, the set of bits may include a first subset of RNTI bits and a second subset of constellation bits. The first subset of bits may indicate RNTIs of UEs 115 that are scheduled to receive one or more of the PDCCH transmission 310-a, the PDCCH transmission 310-b, the PDCCH transmission 310-c, or a PDSCH transmission 330. The MSB of the descrambling sequence may correspond to the first subset of RNTI bits. The second subset of bits may indicate a downlink data channel constellation for the PDSCH transmission 330. The LSB of the descrambling sequence may correspond to the second subset of downlink data channel constellation bits.

The base station 105 may use the downlink reference signal 305 to notify the UE 115 (and other active UEs 115) of which UEs 115 are scheduled to receive the PDCCH transmission 310. For example, if the UE 115 decodes the first subset of RNTI bits and determines that a RNTI of the UE 115 is not indicated by the first subset of bits, the UE 115 may deactivate an RFIC and return to a sleep mode (e.g., until another configured downlink decoding occasion) without decoding subsequent PDCCH transmissions 310. Otherwise, if the UE 115 decodes the first subset of RNTI bits and determines that the first subset of bits indicates a RNTI of the UE 115, the UE 115 may perform DMRS processing 320 associated with the downlink reference signal 305. For example, the UE 115 may proceed with the DMRS processing 320 and descramble the constellation bits to obtain information relating to a downlink data channel. That is, the constellation bits may indicate to the UE 115 whether there is a pending PDSCH transmission 330. If, for example, the UE 115 determines from the descrambled constellation bits that the UE 115 is not intended to receive a PDSCH transmission 330, the UE 115 may deactivate the RFIC and return to sleep mode without performing the DMRS processing 320.

In some cases, the UE 115 may proceed with the DMRS processing 320 (e.g., descrambling the first subset of RNTI bits and the second subset of constellation bits) and the descrambled downlink data constellation bits may indicate to the UE 115 that there is a PDSCH transmission 330 scheduled for the UE 115 in a following symbol duration 315 (e.g., the symbol duration 315-*d*). In such cases, the descrambled constellation may indicate to the UE 115 information associated with the resolution of the ADC at the UE 115. For example, the constellation may indicate to the UE 115 the number of ADC bits to use to complete the DMRS processing 320. The UE 115 may use the information provided in the constellation and update the resolution of the ADC bits (e.g., updating procedure 325). The UE 115 may receive the PDSCH transmission 330 associated with the downlink data channel constellation in the symbol duration 315-*d*.

In some cases, the UE 115 may perform blind decoding of the downlink control channel within a defined UE search space. For example, the UE search space used to perform blind decoding may be defined as the number of possible DCI locations in a CORESET multiplied by the number of possible downlink data channel constellations. The number of possible downlink data channel constellations my be predefined at the UE 115 or defined in an RRC message during connection establishment between the UE 115 and the base station 105. This definition of the UE search space may cause a neglectable increase of the UE 115 complexity (e.g., at the correlator) and decrease the power consumption of a DFE at the UE 115. In some cases, the downlink control channels may be PDCCHs and the downlink data channel may be PDSCHs.

The downlink reference signal 305 may be modulated instead of scrambled with a non-coherent waveform. In such examples, the UE 115 may receive a modulated downlink reference signal (e.g., a modulated DMRS) during the symbol duration 315-*a*. In cases in which the downlink reference signal 305 is modulated, the downlink reference signal 305 may include a set of modulated bits which may include a first subset of modulated RNTI bits and a second subset of modulated downlink data channel constellation bits. The base station 105 may use the downlink reference signal 305 to notify the UE 115 (and other active UEs 115) of which UEs 115 are scheduled to receive the PDCCH transmission 310.

For example, if the UE 115 demodulates the first subset of modulated RNTI bits and determines that a RNTI of the UE 115 is not indicated by the first subset of bits, the UE 115 may deactivate an RFIC and return to a sleep mode (e.g., until another configured downlink decoding occasion) without performing the DMRS processing 320 or decoding further PDCCH transmissions 310. Otherwise, if the UE 115 demodulates the first subset of modulated RNTI bits and determines that the first subset of bits indicates a RNTI of the UE 115, the UE 115 may perform the DMRS processing 320 on the downlink reference signal 305. For example, the UE 115 may proceed with the DMRS processing 320 and demodulate the downlink data channel constellation to obtain information relating to a downlink data channel. That is, the downlink data channel constellation may indicate to the UE 115 whether there is a pending PDSCH transmission 330. If, for example, the UE 115 determines from the downlink data channel constellation that the UE 115 is not intended to receive a PDSCH transmission 330, the UE 115 may deactivate the RFIC and return to sleep mode with performing the DMRS processing 320.

In some cases, the UE 115 may proceed with the DMRS processing 320 (e.g., demodulating the first subset of RNTI bits and the second subset of constellation bits) and the demodulated downlink data constellation bits may indicate to the UE 115 that there is a PDSCH transmission 330 scheduled for the UE 115 in a following symbol duration 315 (e.g., the symbol duration 315-*d*). In such cases, the demodulated constellation may indicate to the UE 115 information associated with the resolution of the ADC at the UE 115. For example, the constellation may indicate to the UE 115 the number of ADC bits to use to complete the DMRS processing 320. The UE 115 may use the information provided in the demodulated constellation and update the resolution of the ADC bits (e.g., the updating procedure 325). The UE 115 may receive the PDSCH transmission 330 associated with the downlink data channel constellation in the symbol duration 315-*d*.

In cases of a modulated downlink reference signal, the base station 105 may transmit more information (e.g., the number of bits in the first set) to the UE 115, when compared to a non-modulated downlink reference signal. In such examples, the downlink data channel constellation information may be carried un-precoded with a repetition configured by the base station 105. By transmitting the data channel constellation un-precoded, the DFE at the UE 115 may realize a reduction in power consumption.

The downlink reference signal 305 may be based on capabilities of the UE 115. For example, the UE 115 may transmit, to the base station 105, a capability report indicating that the UE 115 supports a configurable ADC capability. In some examples, if the UE 115 does not support the configurable ADC support capability (e.g., if the UE 115 is unable to configure the ADC resolution based on the information included in the downlink data channel constellation), the base station 105 may refrain from configuring the downlink reference signal 305 with a downlink data channel constellation. For example, the base station 105 may configure a downlink reference signal for a first set of UEs 115 supporting configurable ADC capability, and a may configure a second downlink reference signal for a second set of UEs 115 not supporting configurable ADC capability.

The base station 105 may control the downlink reference signal 305 for UEs 115 based on an SNR associated with the downlink reference signal 305. For example, the UE 115 may determine the SNR associated with the downlink reference signal 305 and report the SNR value to the base station 105. The base station 105 may compare the SNR value associated with the downlink reference signal 305 to a configured SNR threshold. In cases in which the SNR value is below the configured SNR threshold, the base station 105 may transmit the downlink reference signal 305. In cases in which the SNR value is above the SNR threshold, the base station 105 may limit transmission of the downlink reference signal 305 to decrease the mis-detection rate of the downlink reference signal 305.

In some cases, the base station 105 may include the downlink reference signal 305 with a PDCCH transmission 310 (e.g., PDCCH transmission 310-*a*) in the first OFDM symbol (e.g. the symbol duration 315-*a*) based on a battery status report from the UE 115. For example, the UE 115 may transmit a battery status report that includes a rate of power consumption, a percentage of a total battery power remaining, an allocation of battery usage, or a combination thereof. The base station 105 may use the UE 115 battery status report to determine that status of the UE 115 battery life (e.g., high battery life or low battery life). In cases in which the base station 105 determines the UE 115 to have a low battery life, the base station 105 may include the downlink reference signal 305 in the first OFDM symbol (e.g., the symbol duration 315-*a*).

Figure 4:
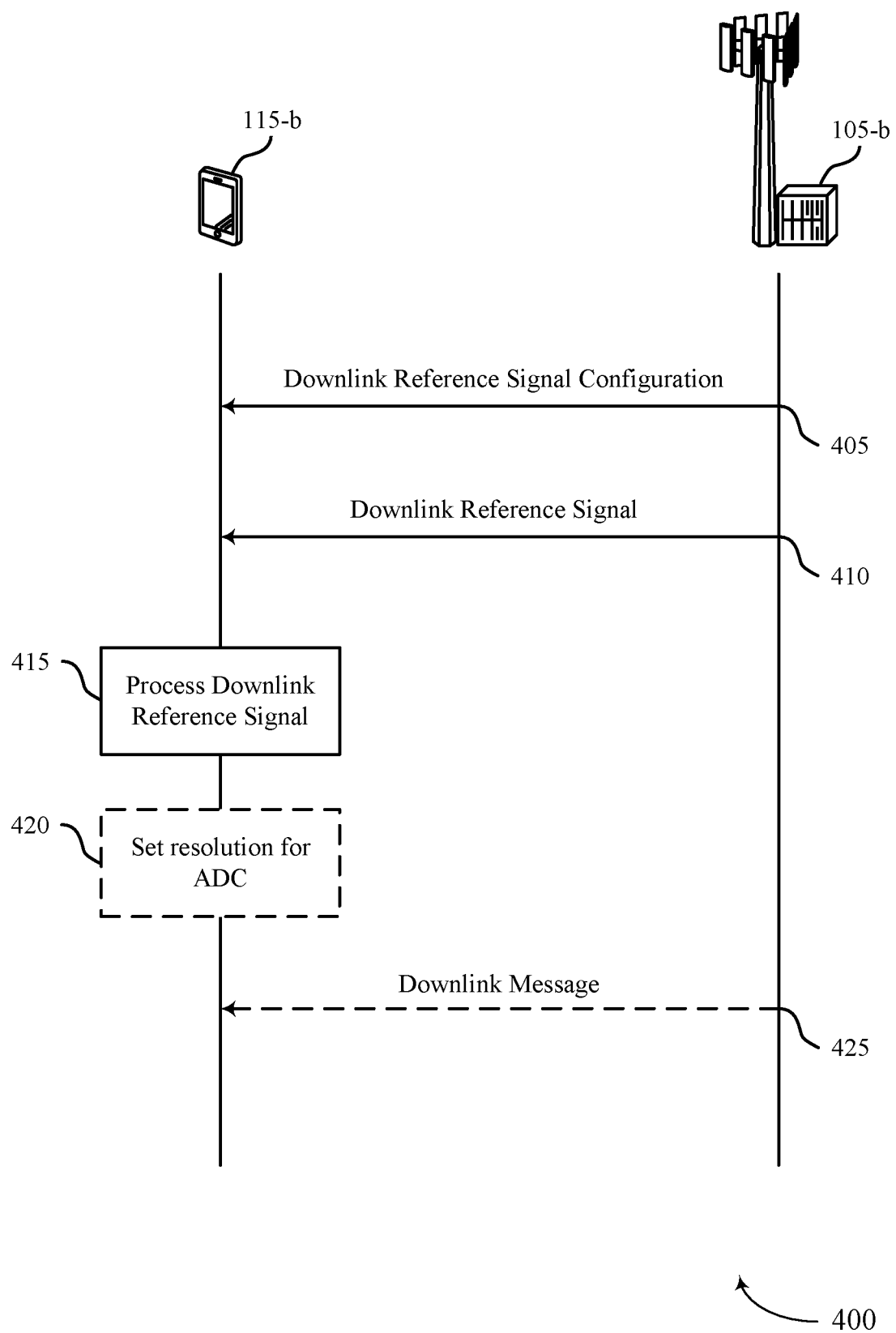
FIG. 4 illustrates an example of a process flow in accordance with aspects of the present disclosure.

FIG. 4 illustrates an example of process flow 400 in accordance with aspects of the present disclosure. In some examples, the process flow 400 may implement aspects of the wireless communications system 100 or 200, or may be implemented by aspects of the wireless communications systems 100 and 200 as described with reference to FIGS. 1 and 2. For example, the process flow 400 may implement or be implemented by a base station 105-*b* and a UE 115-*b*, which may be respective examples of devices as described with reference to FIGS. 1 and 2. In the following description of the process flow 400, the operations between the base station 105-*b* and the UE 115-*b* may be performed in a different order than the example order shown, or the operations performed by the base station 105-*b* and the UE 115-*b* may be performed at different times. Some operations may also be omitted from the process flow 400, and other operations may be added to the process flow 400.

At 405, the UE 115-*b* may receive control signaling from the base station 105-*b* indicating a downlink reference signal configuration. For example, the downlink reference signal configuration may include a RNTI that corresponds to the UE 115-*b* and may also include a downlink data channel constellation. In some cases, the configuration of the downlink reference signal may be based on UE capability information. For example, the downlink reference signal configuration may include the downlink channel constellation based on the UE 115-*b* reporting an ADC capability to the base station 105-*b*.

At 410, the UE 115-*b* may receive a downlink reference signal over a downlink control channel during an initial symbol duration of a TTI. In some cases, the initial symbol duration may be an OFDM symbol. In some examples, the downlink reference signal may be a demodulation reference signal (e.g., a DMRS). The downlink reference signal may include a first set of bits that includes a first subset of bits that includes a RNTI and a second subset of bits that includes constellation bits associated with a downlink data channel. In some examples, the first subset of bits that includes RNTI bits may include at least a portion of a RNTI that corresponds to the UE 115-*b*. In some examples, the downlink control channel may be a PDCCH and the downlink data channel indicated in the constellation may be a PDSCH.

In some cases, the UE 115-*b* may receive the downlink reference signal based on the UE 115-*b* capability information that the UE 115-*b* may transmit to the base station 105-*b*. In some examples, the UE 115-*b* may transmit a battery status report that may include an indication of one or more of a rate of power consumption, a percentage of a total battery power remaining, or an allocation of a battery usage. The base station 105-*b* may determine whether to transmit a downlink reference signal to the UE 115-*b* based on the information included in the battery report. Thus, the UE 115-*b* may receive the downlink reference signal over the downlink control channel during the initial symbol duration of the transmission time interval based on the battery status report. In some examples, the UE 115-*b* may also determine an SNR associated with the downlink reference signal. The base station 105-*b* may limit the transmission of downlink reference signals to a UE 115-*b* that determine an unsatisfactory SNR associated with the downlink reference signal. That is, receiving the downlink reference signal over the downlink control channel during the initial symbol duration of the transmission time interval may be based on the SNR associated with the downlink reference signal satisfying a threshold.

At 415, the UE 115-*b* may process the downlink reference signal based on the downlink reference signal configuration. For example, in cases in which the downlink reference signal is a modulated reference signal, the UE 115-*b* may process the downlink reference signal by demodulating the modulated downlink reference signal. The modulated downlink reference signal may include a set of modulated bits including the first subset of bits (e.g., RNTI bits) and the second subset of bits (e.g., the downlink data channel constellation bits). In some other examples, the downlink reference signal may be a scrambled downlink reference signal. In such examples, processing the downlink reference signal is based on descrambling the downlink reference signal.

For example, the UE 115-*b* may use a descrambling sequence to descramble the downlink reference signal in which the MSB of the descrambling sequence corresponds to the first subset of bits (e.g., the RNTI bits) and the LSB of the descrambling sequence corresponds the second subset of bits (e.g., downlink data channel constellation bits). The downlink reference signal may be scrambled by the base station 105-*b* based on a noncoherent waveform. The UE 115-*b* may also determine a UE 115-*b* search space associated with the downlink reference signal configuration. For example, the UE 115-*b* search space may correspond to one or more of a number of candidate downlink control channel locations in a control resource set or a number of constellations, such that receiving the downlink reference signal may be based on the UE 115-*b* search space At 420, the UE 115-*b* may set a resolution for an ADC associated with the UE 115-*b* that is used to process the downlink reference signal. The resolution (e.g., number of bits) for the ADC may be based on processing the downlink reference signal. For example the downlink reference signal may include a third subset of bits that includes ADC bits associated with the resolution of the ADC. At 425, the UE 115-*b* may receive a downlink message on the downlink data channel during a symbol duration after the initial symbol duration of the TTI based on processing the downlink reference signal. For example, the downlink reference signal may indicate that the UE 115-*b* is scheduled for downlink message on the downlink data channel that is associated with the second subset of bits (e.g., the downlink data channel constellation bits).

Figure 5:
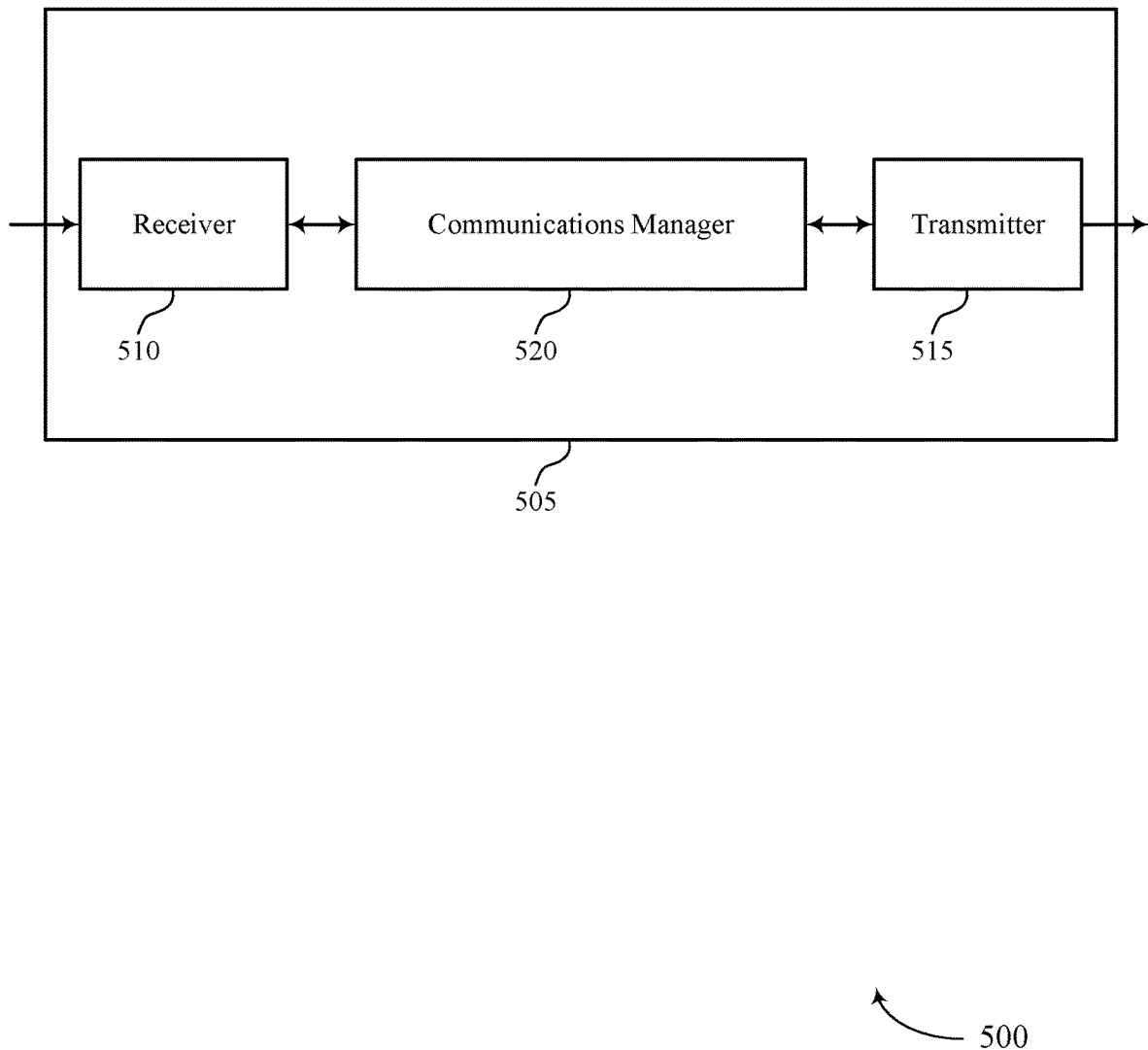
FIGS. 5 and 6 show block diagrams of devices in accordance with aspects of the present disclosure.

FIG. 5 shows a block diagram 500 of a device 505 in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to modulated downlink reference signal for low power operations). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to modulated downlink reference signal for low power operations). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of modulated downlink reference signal for low power operations as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving control signaling indicating a downlink reference signal configuration. The communications manager 520 may be configured as or otherwise support a means for receiving a downlink reference signal over a downlink control channel during an initial symbol duration of a TTI, the downlink reference signal including a set of bits including a first subset of bits including network temporary identifier bits and a second subset of bits including constellation bits associated with a downlink data channel. The communications manager 520 may be configured as or otherwise support a means for processing the downlink reference signal based on the downlink reference signal configuration. By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption.

Figure 6:
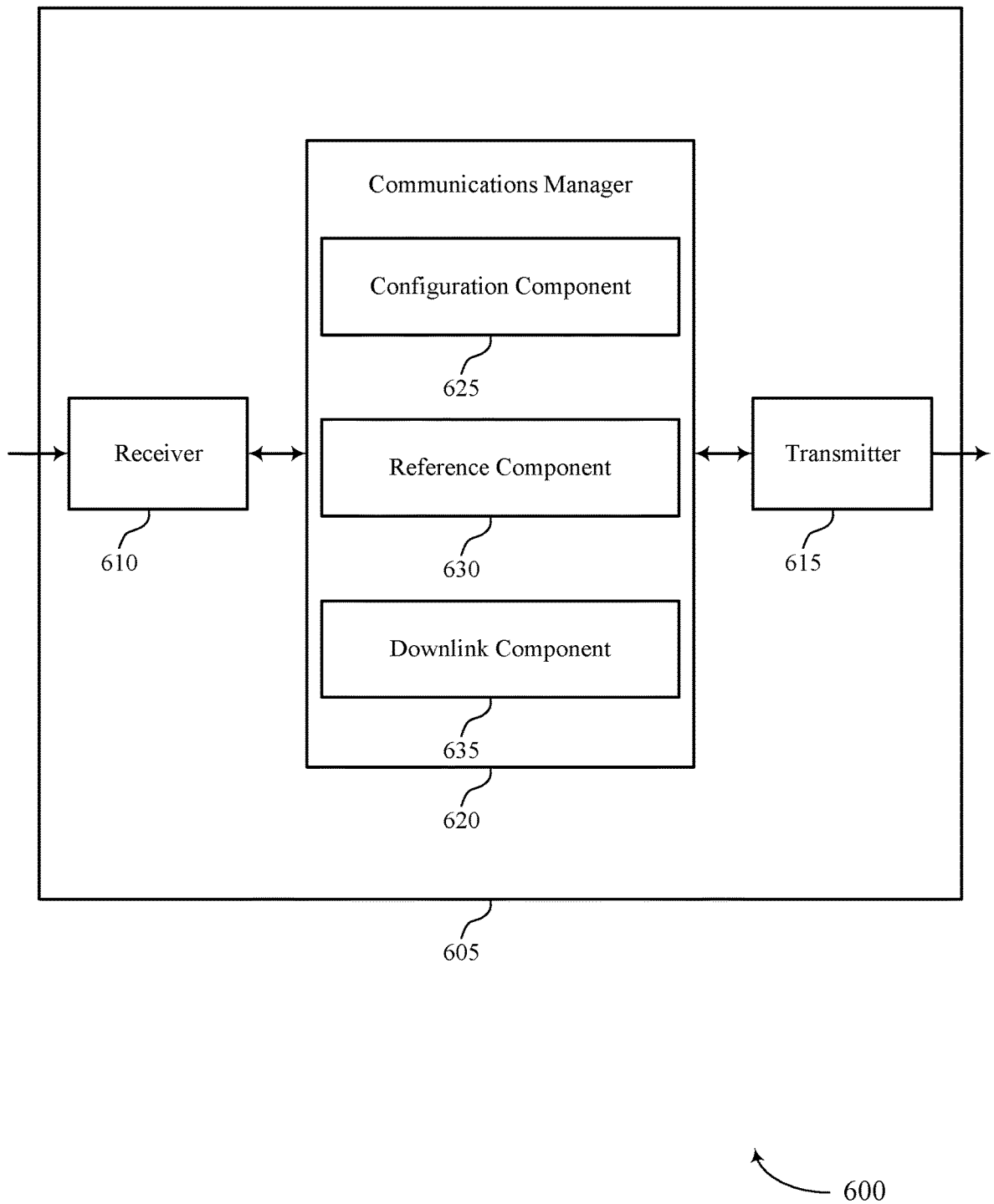

FIG. 6 shows a block diagram 600 of a device 605 in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to modulated downlink reference signal for low power operations). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to modulated downlink reference signal for low power operations). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of modulated downlink reference signal for low power operations as described herein. For example, the communications manager 620 may include a configuration component 625, a reference component 630, a downlink component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The configuration component 625 may be configured as or otherwise support a means for receiving control signaling indicating a downlink reference signal configuration. The reference component 630 may be configured as or otherwise support a means for receiving a downlink reference signal over a downlink control channel during an initial symbol duration of a TTI, the downlink reference signal including a set of bits including a first subset of bits including network temporary identifier bits and a second subset of bits including constellation bits associated with a downlink data channel. The downlink component 635 may be configured as or otherwise support a means for processing the downlink reference signal based on the downlink reference signal configuration.

Figure 7:
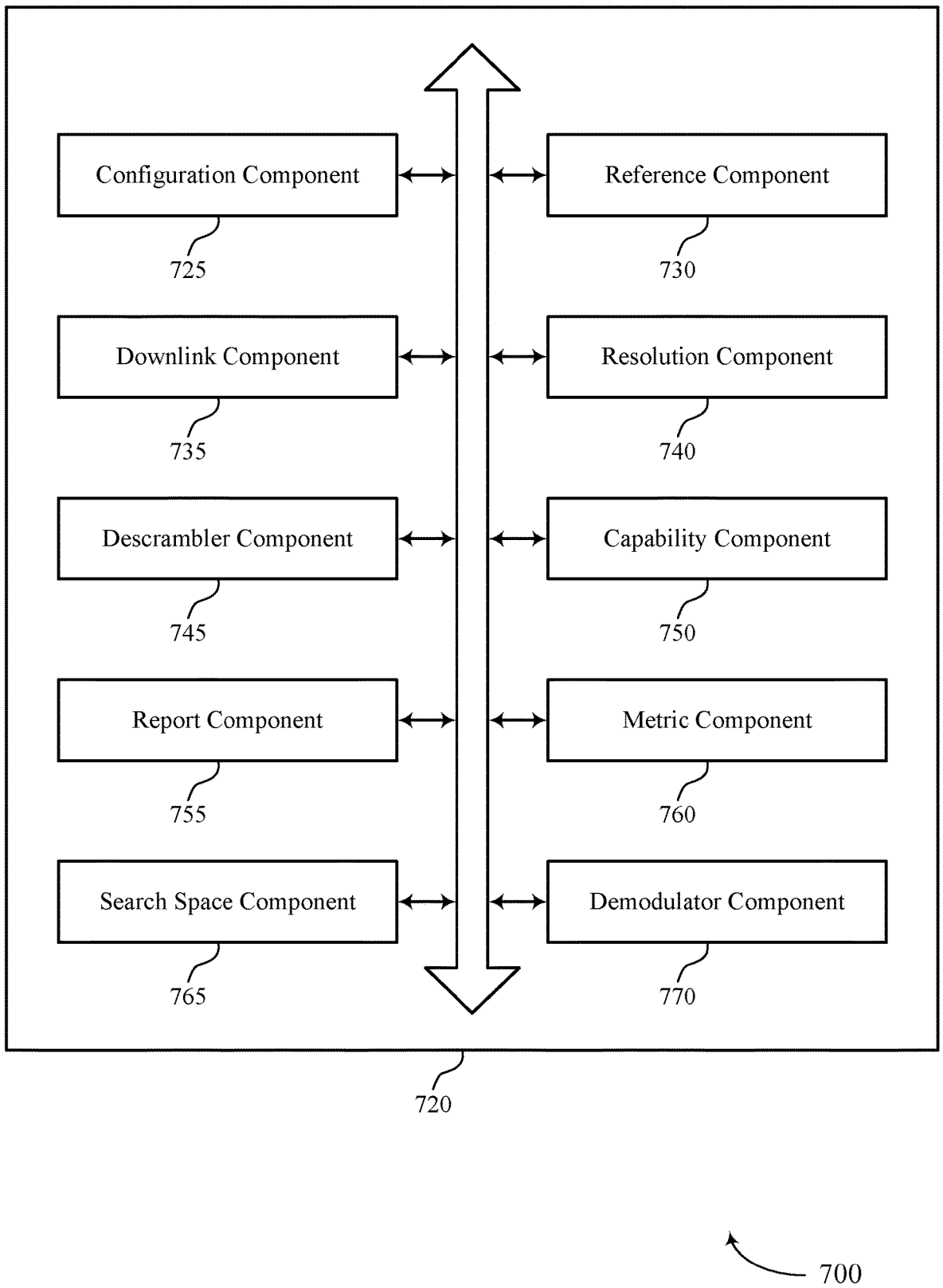
FIG. 7 shows a block diagram of a communications manager in accordance with aspects of the present disclosure.

FIG. 7 shows a block diagram 700 of a communications manager 720 in accordance with aspects of the present disclosure. The communications manager 720 may be an example of aspects of a communications manager 520, a communications manager 620, or both, as described herein. The communications manager 720, or various components thereof, may be an example of means for performing various aspects of modulated downlink reference signal for low power operations as described herein. For example, the communications manager 720 may include a configuration component 725, a reference component 730, a downlink component 735, a resolution component 740, a descrambler component 745, a capability component 750, a report component 755, a metric component 760, a search space component 765, a demodulator component 770, or any combination thereof. Each of these components may communicate, directly or indirectly, with one another (e.g., via one or more buses).

The communications manager 720 may support wireless communication at a UE in accordance with examples as disclosed herein. The configuration component 725 may be configured as or otherwise support a means for receiving control signaling indicating a downlink reference signal configuration. The reference component 730 may be configured as or otherwise support a means for receiving a downlink reference signal over a downlink control channel during an initial symbol duration of a TTI, the downlink reference signal including a set of bits including a first subset of bits including network temporary identifier bits and a second subset of bits including constellation bits associated with a downlink data channel. The downlink component 735 may be configured as or otherwise support a means for processing the downlink reference signal based on the downlink reference signal configuration. In some examples, the resolution component 740 may be configured as or otherwise support a means for setting a resolution for an ADC associated with the UE based on processing the downlink reference signal, where the set of bits includes a third subset of bits including ADC bits associated with the resolution for the ADC.

In some examples, to support receiving the downlink reference signal, the reference component 730 may be configured as or otherwise support a means for receiving a modulated downlink reference signal over the downlink control channel during the initial symbol duration of the TTI. In some examples, the modulated downlink reference signal includes a set of modulated bits including the first subset of bits and the second subset of bits. In some examples, the demodulator component 770 may be configured as or otherwise support a means for demodulating the modulated downlink reference signal based on the downlink reference signal configuration. In some examples, the downlink component 735 may be configured as or otherwise support a means for processing the downlink reference signal based on demodulating the modulated downlink reference signal.

In some examples, the descrambler component 745 may be configured as or otherwise support a means for descrambling the downlink reference signal based on a descrambling sequence, a MSB of the descrambling sequence corresponds to the first subset of bits and a LSB corresponds to the second subset of bits. In some examples, the downlink component 735 may be configured as or otherwise support a means for where processing the downlink reference signal is based on descrambling the downlink reference signal. In some examples, the downlink component 735 may be configured as or otherwise support a means for receiving a downlink message on the downlink data channel during a symbol duration after the initial symbol duration of the TTI based on processing the downlink reference signal, where the downlink data channel includes a PDSCH. In some examples, the downlink reference signal is scrambled based on a noncoherent waveform.

In some examples, the capability component 750 may be configured as or otherwise support a means for transmitting UE capability information. In some examples, the reference component 730 may be configured as or otherwise support a means for receiving the downlink reference signal over the downlink control channel during the initial symbol duration of the TTI based on the UE capability information. In some examples, the report component 755 may be configured as or otherwise support a means for transmitting a battery status report including an indication of one or more of a rate of power consumption, a percentage of a total battery power remaining, or an allocation of a battery usage. In some examples, the reference component 730 may be configured as or otherwise support a means for receiving the downlink reference signal over the downlink control channel during the initial symbol duration of the TTI based on the battery status report.

In some examples, the metric component 760 may be configured as or otherwise support a means for determining a SNR associated with the downlink reference signal. In some examples, the reference component 730 may be configured as or otherwise support a means for receiving the downlink reference signal over the downlink control channel during the initial symbol duration of the TTI based on the SNR associated with the downlink reference signal satisfying a threshold. In some examples, the first subset of bits including the network temporary identifier bits includes at least a portion of a network temporary identifier corresponding to the UE.

In some examples, the search space component 765 may be configured as or otherwise support a means for determining a UE search space associated with the downlink control channel based on the downlink reference signal configuration, the UE search space corresponding to one or more of a number of candidate downlink control channel locations in a control resource set or a number of constellations. In some examples, the reference component 730 may be configured as or otherwise support a means for receiving the downlink reference signal based on the UE search space. In some examples, the downlink reference signal includes a DMRS. In some examples, the downlink control channel includes a PDCCH and the downlink data channel includes a PDSCH. In some examples, the initial symbol duration includes an OFDM.

Figure 8:
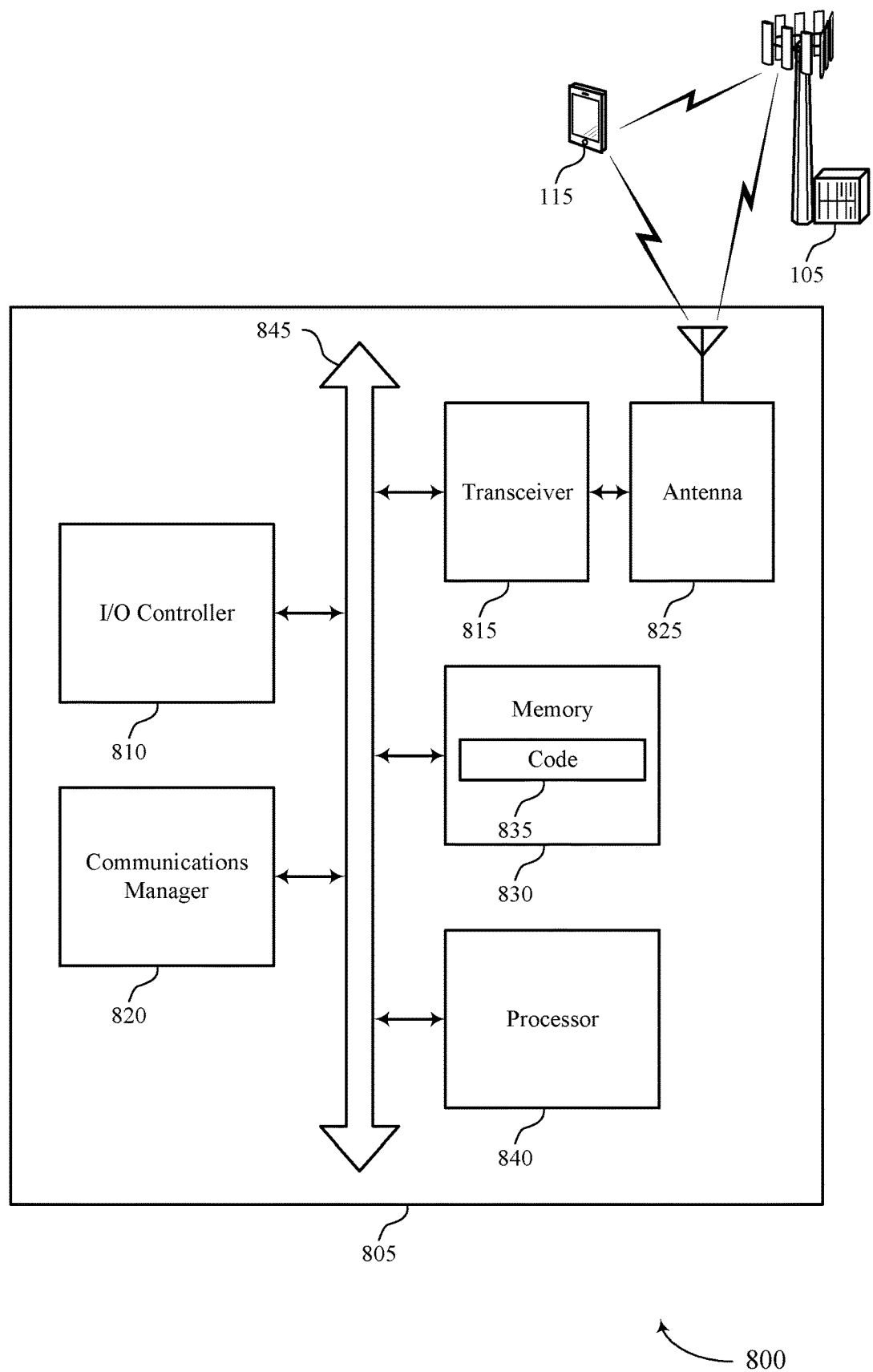
FIG. 8 shows a diagram of a system including a device in accordance with aspects of the present disclosure.

FIG. 8 shows a diagram of a system 800 including a device 805 in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting modulated downlink reference signal for low power operations). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving control signaling indicating a downlink reference signal configuration. The communications manager 820 may be configured as or otherwise support a means for receiving a downlink reference signal over a downlink control channel during an initial symbol duration of a TTI, the downlink reference signal including a set of bits including a first subset of bits including network temporary identifier bits and a second subset of bits including constellation bits associated with a downlink data channel. The communications manager 820 may be configured as or otherwise support a means for processing the downlink reference signal based on the downlink reference signal configuration.

By including or configuring the communications manager 820 in accordance with examples as described herein, the device 805 may support techniques for reduced latency, reduced processing, reduced power consumption, and longer battery life.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of modulated downlink reference signal for low power operations as described herein, or the processor 840 and the memory 830 may be otherwise configured to perform or support such operations.

Figure 9:
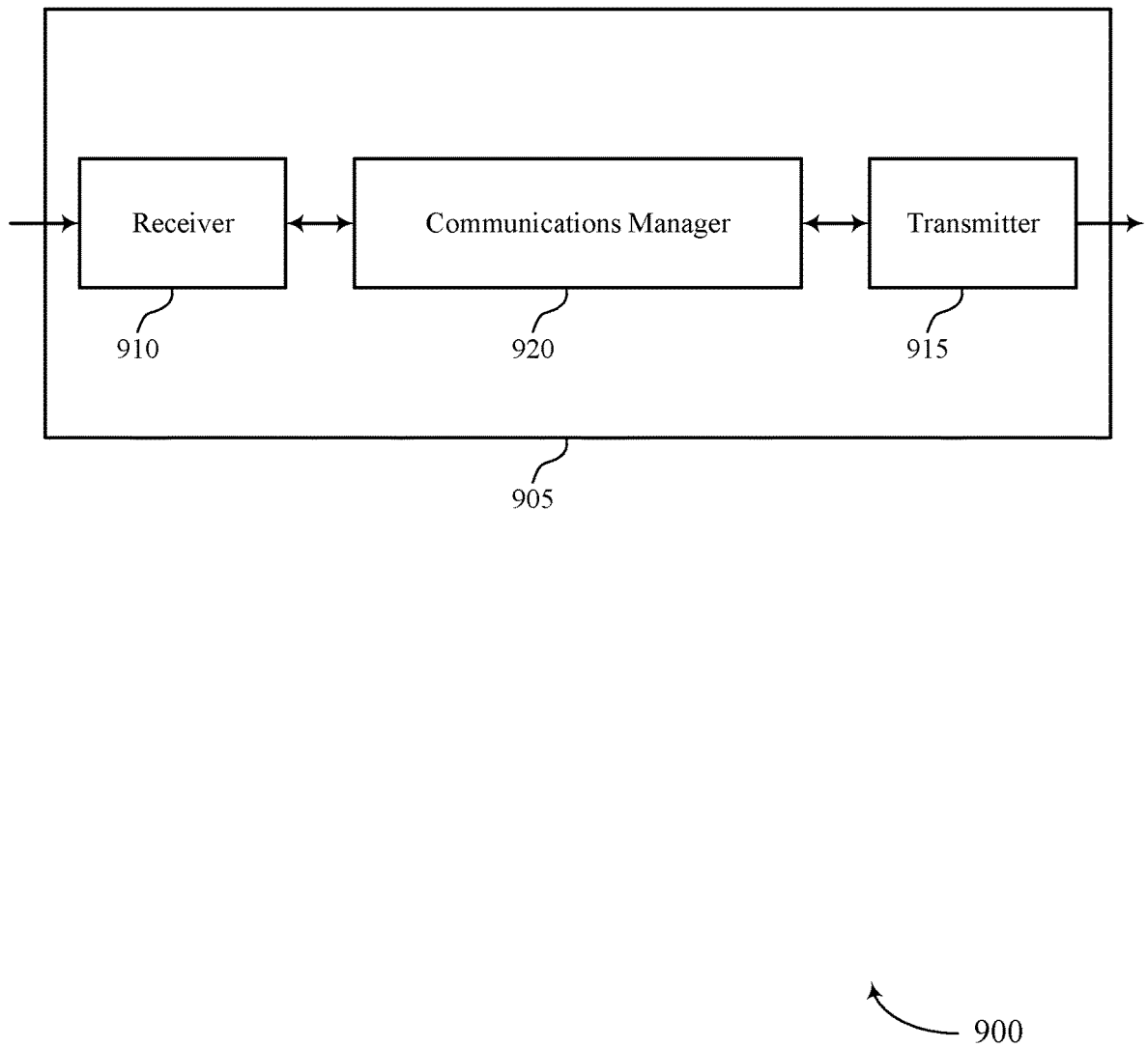
FIGS. 9 and 10 show block diagrams of devices in accordance with aspects of the present disclosure.

FIG. 9 shows a block diagram 900 of a device 905 in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to modulated downlink reference signal for low power operations). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to modulated downlink reference signal for low power operations). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of modulated downlink reference signal for low power operations as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for transmitting control signaling to a UE, the control signaling indicating a downlink reference signal configuration. The communications manager 920 may be configured as or otherwise support a means for transmitting a downlink reference signal to the UE over a downlink control channel during an initial symbol duration of a TTI, the downlink reference signal including a set of bits including a first subset of bits including network temporary identifier bits and a second subset of bits including constellation bits associated with a downlink data channel.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing and reduced power consumption.

Figure 10:
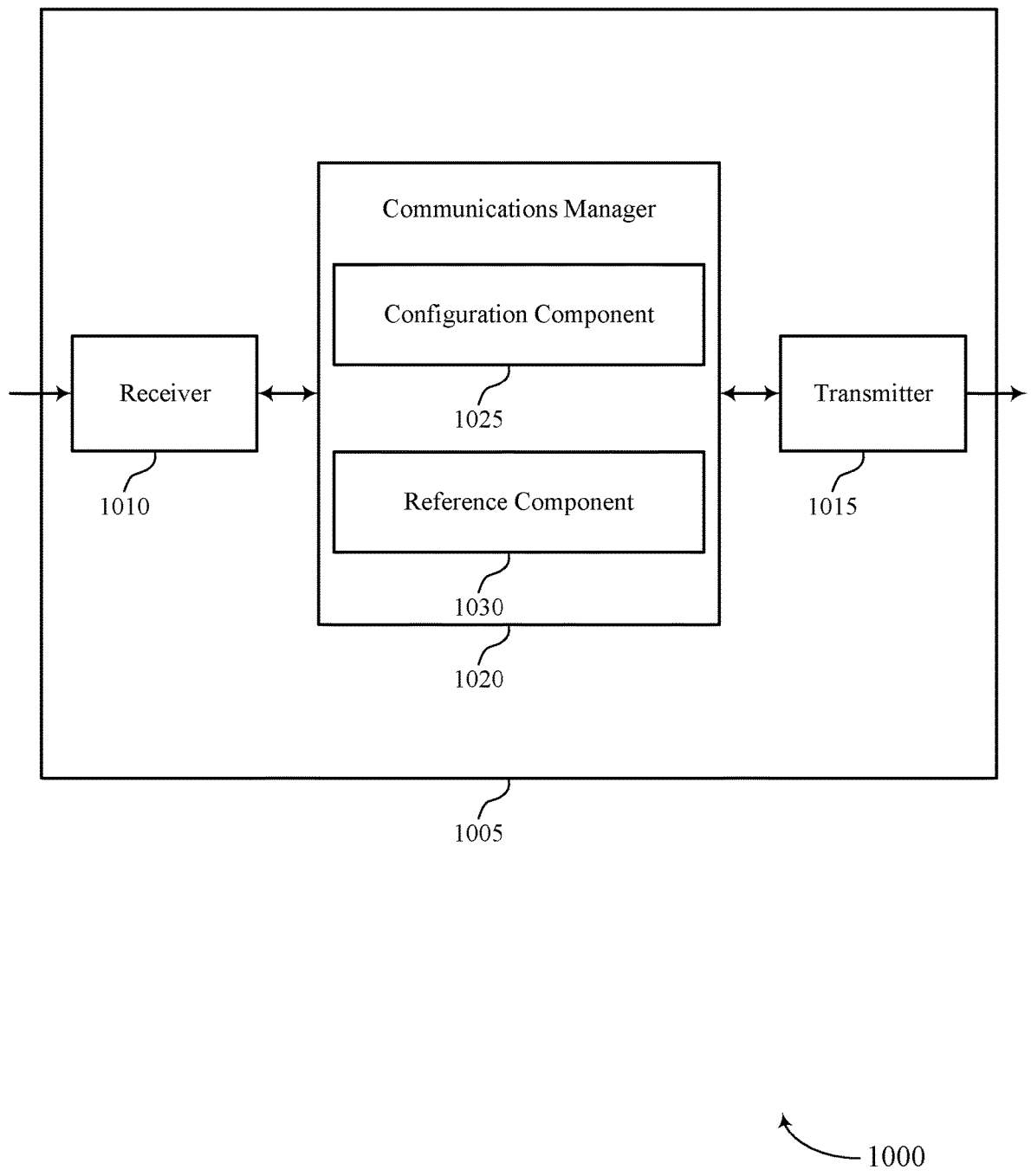

FIG. 10 shows a block diagram 1000 of a device 1005 in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to modulated downlink reference signal for low power operations). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to modulated downlink reference signal for low power operations). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of modulated downlink reference signal for low power operations as described herein. For example, the communications manager 1020 may include a configuration component 1025 a reference component 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The configuration component 1025 may be configured as or otherwise support a means for transmitting control signaling to a UE, the control signaling indicating a downlink reference signal configuration. The reference component 1030 may be configured as or otherwise support a means for transmitting a downlink reference signal to the UE over a downlink control channel during an initial symbol duration of a TTI, the downlink reference signal including a set of bits including a first subset of bits including network temporary identifier bits and a second subset of bits including constellation bits associated with a downlink data channel.

Figure 11:
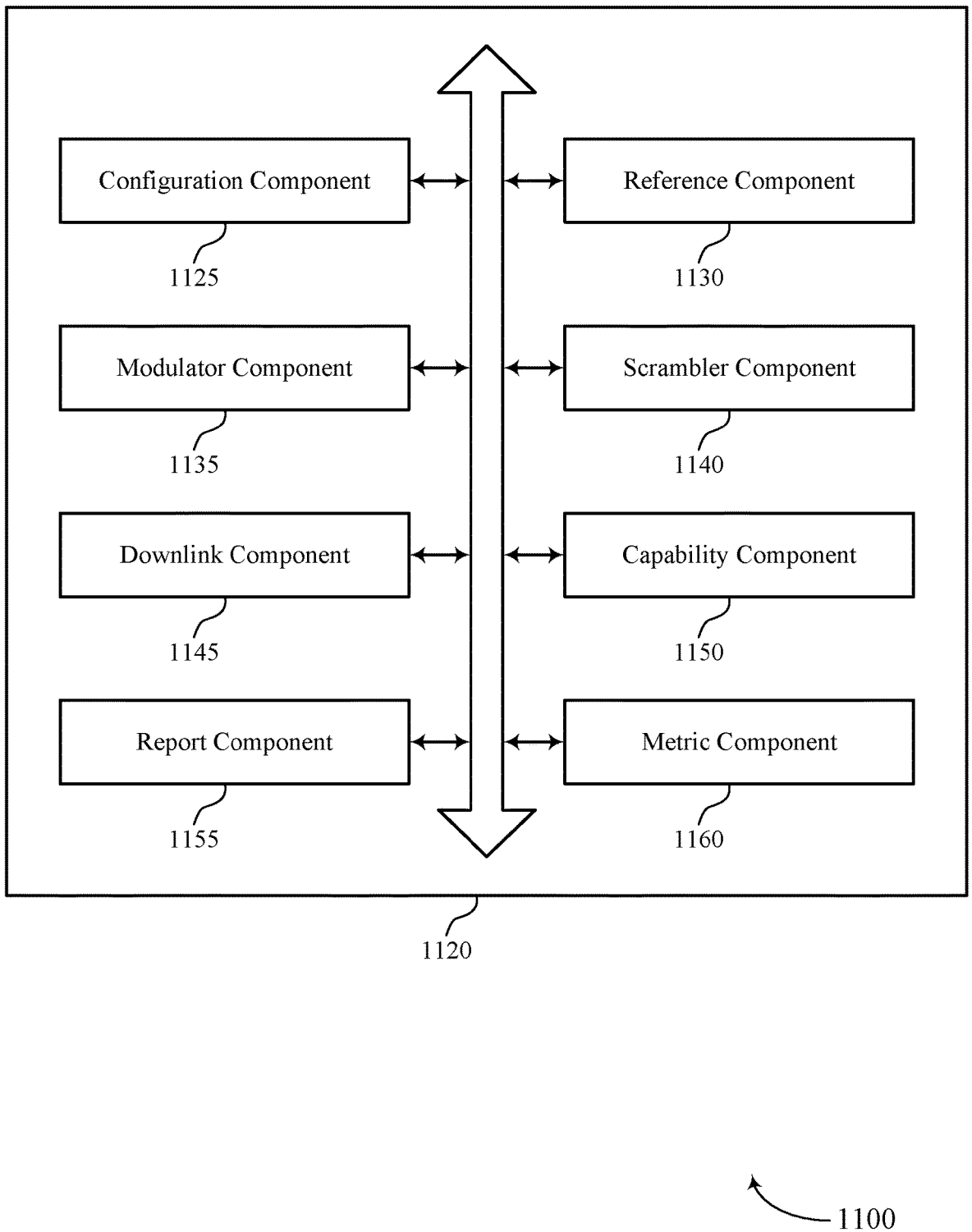
FIG. 11 shows a block diagram of a communications manager in accordance with aspects of the present disclosure.

FIG. 11 shows a block diagram 1100 of a communications manager 1120 in accordance with aspects of the present disclosure. The communications manager 1120 may be an example of aspects of a communications manager 920, a communications manager 1020, or both, as described herein. The communications manager 1120, or various components thereof, may be an example of means for performing various aspects of modulated downlink reference signal for low power operations as described herein. For example, the communications manager 1120 may include a configuration component 1125, a reference component 1130, a modulator component 1135, a scrambler component 1140, a downlink component 1145, a capability component 1150, a report component 1155, a metric component 1160, or any combination thereof. Each of these components may communicate, directly or indirectly, with one another (e.g., via one or more buses).

The communications manager 1120 may support wireless communication at a base station in accordance with examples as disclosed herein. The configuration component 1125 may be configured as or otherwise support a means for transmitting control signaling to a UE, the control signaling indicating a downlink reference signal configuration. The reference component 1130 may be configured as or otherwise support a means for transmitting a downlink reference signal to the UE over a downlink control channel during an initial symbol duration of a TTI, the downlink reference signal including a set of bits including a first subset of bits including network temporary identifier bits and a second subset of bits including constellation bits associated with a downlink data channel.

In some examples, the modulator component 1135 may be configured as or otherwise support a means for modulating the downlink reference signal based on the downlink reference signal configuration, where the modulated downlink reference signal includes a set of modulated bits including the first subset of bits and the second subset of bits. In some examples, the reference component 1130 may be configured as or otherwise support a means for transmitting the modulated downlink reference signal to the UE over the downlink control channel during the initial symbol duration of the TTI. In some examples, the scrambler component 1140 may be configured as or otherwise support a means for scrambling the downlink reference signal based on a scrambling sequence, a MSB of the scrambling sequence corresponds to the first subset of bits and a LSB corresponds to the second subset of bits.

In some examples, the downlink component 1145 may be configured as or otherwise support a means for transmitting a downlink message on the downlink data channel during a symbol duration after the initial symbol duration of the TTI based on processing the downlink reference signal. In some examples, the downlink data channel includes a PDSCH. In some examples, the downlink reference signal is scrambled based on a noncoherent waveform. In some examples, the capability component 1150 may be configured as or otherwise support a means for receiving UE capability information. In some examples, the reference component 1130 may be configured as or otherwise support a means for transmitting the downlink reference signal to the UE over the downlink control channel during the initial symbol duration of the TTI based on the UE capability information.

In some examples, the report component 1155 may be configured as or otherwise support a means for receiving a battery status report including an indication of one or more of a rate of power consumption, a percentage of a total battery power remaining, or an allocation of a battery usage. In some examples, the reference component 1130 may be configured as or otherwise support a means for transmitting the downlink reference signal to the UE over the downlink control channel during the initial symbol duration of the TTI based on the battery status report. In some examples, the metric component 1160 may be configured as or otherwise support a means for determining a SNR associated with the downlink reference signal. In some examples, the reference component 1130 may be configured as or otherwise support a means for transmitting the downlink reference signal to the UE over the downlink control channel during the initial symbol duration of the TTI based on the SNR satisfying a threshold.

In some examples, the first subset of bits including the network temporary identifier bits includes at least a portion of a network temporary identifier corresponding to the UE. In some examples, the downlink reference signal includes a DMRS. In some examples, the downlink control channel includes a PDCCH and the downlink data channel includes a PDSCH. In some examples, the initial symbol duration includes an OFDM.

Figure 12:
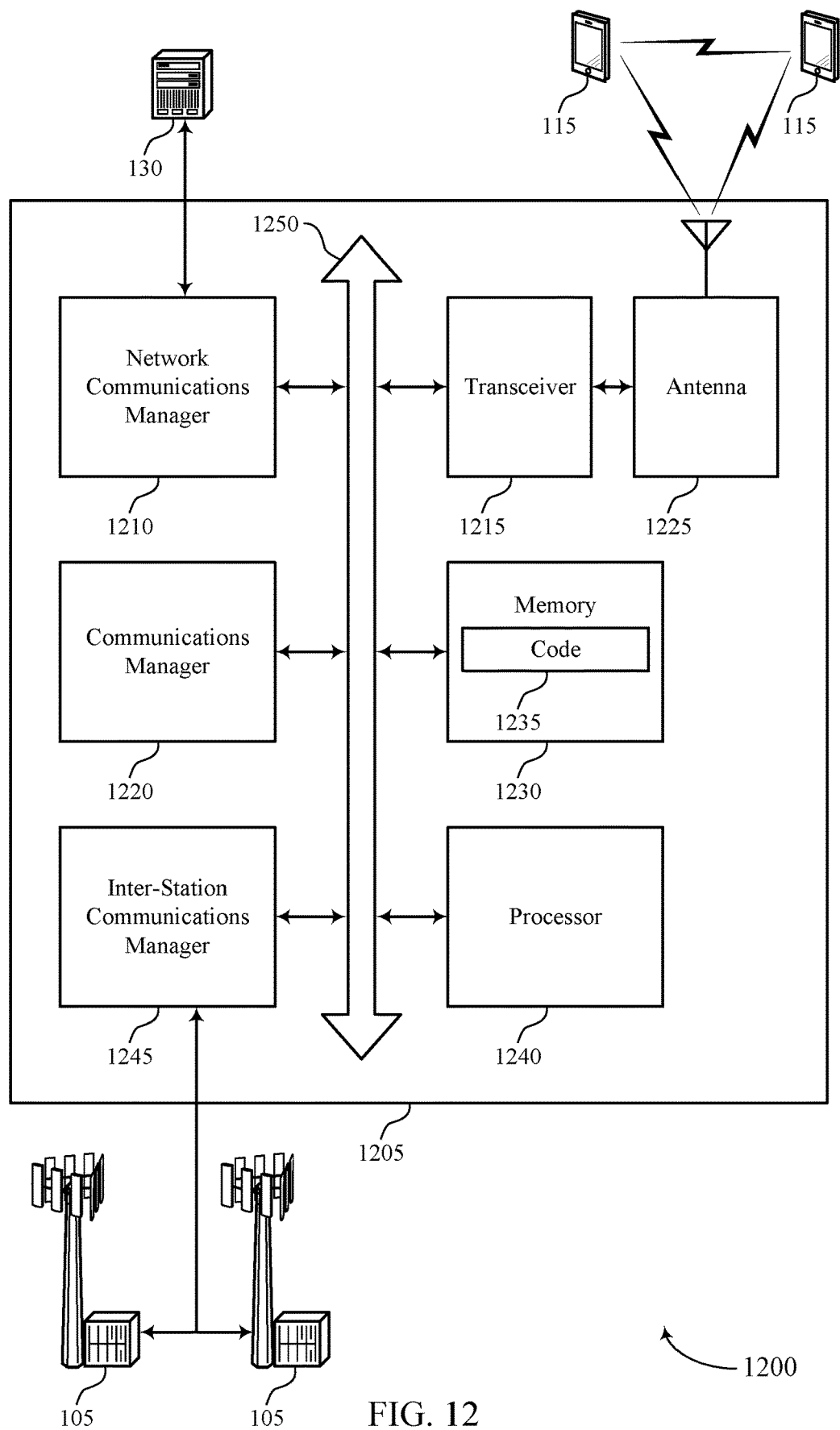
FIG. 12 shows a diagram of a system including a device in accordance with aspects of the present disclosure.

FIG. 12 shows a diagram of a system 1200 including a device 1205 in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory.

In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting modulated downlink reference signal for low power operations). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for transmitting control signaling to a UE, the control signaling indicating a downlink reference signal configuration. The communications manager 1220 may be configured as or otherwise support a means for transmitting a downlink reference signal to the UE over a downlink control channel during an initial symbol duration of a TTI, the downlink reference signal including a set of bits including a first subset of bits including network temporary identifier bits and a second subset of bits including constellation bits associated with a downlink data channel. By including or configuring the communications manager 1220 in accordance with examples as described herein, the device 1205 may support techniques for reduced power consumption and longer battery life.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of modulated downlink reference signal for low power operations as described herein, or the processor 1240 and the memory 1230 may be otherwise configured to perform or support such operations.

Figure 13:
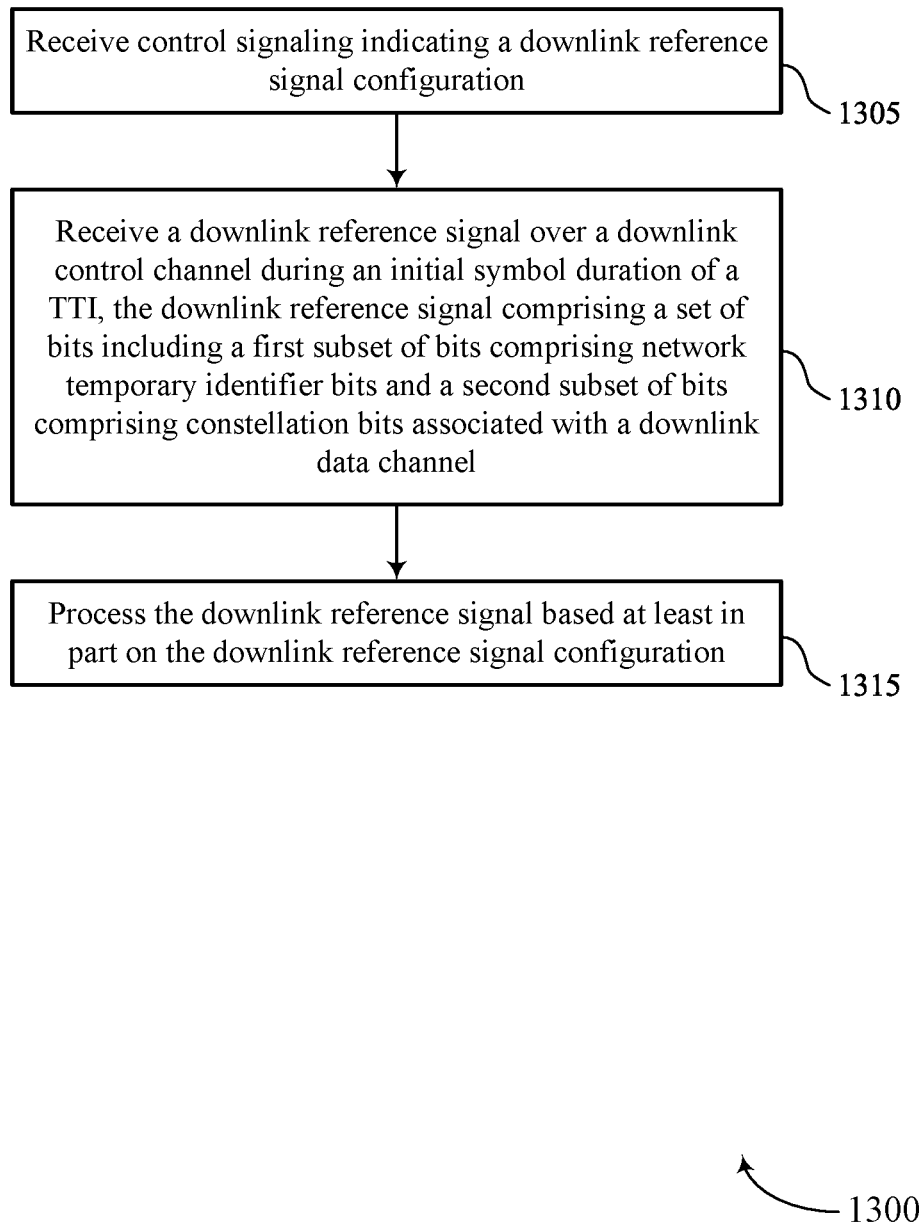
FIGS. 13 through 18 show flowcharts illustrating methods in accordance with aspects of the present disclosure.

FIG. 13 shows a flowchart illustrating a method 1300 in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving control signaling indicating a downlink reference signal configuration. The operations of 1305 may be performed in accordance with examples as disclosed herein. In some examples, aspects of the operations of 1305 may be performed by a configuration component 725 as described with reference to FIG. 7.

At 1310, the method may include receiving a downlink reference signal over a downlink control channel during an initial symbol duration of a TTI, the downlink reference signal including a set of bits including a first subset of bits including network temporary identifier bits and a second subset of bits including constellation bits associated with a downlink data channel. The operations of 1310 may be performed in accordance with examples as disclosed herein. In some examples, aspects of the operations of 1310 may be performed by a reference component 730 as described with reference to FIG. 7.

At 1315, the method may include processing the downlink reference signal based on the downlink reference signal configuration. The operations of 1315 may be performed in accordance with examples as disclosed herein. In some examples, aspects of the operations of 1315 may be performed by a downlink component 735 as described with reference to FIG. 7.

Figure 14:
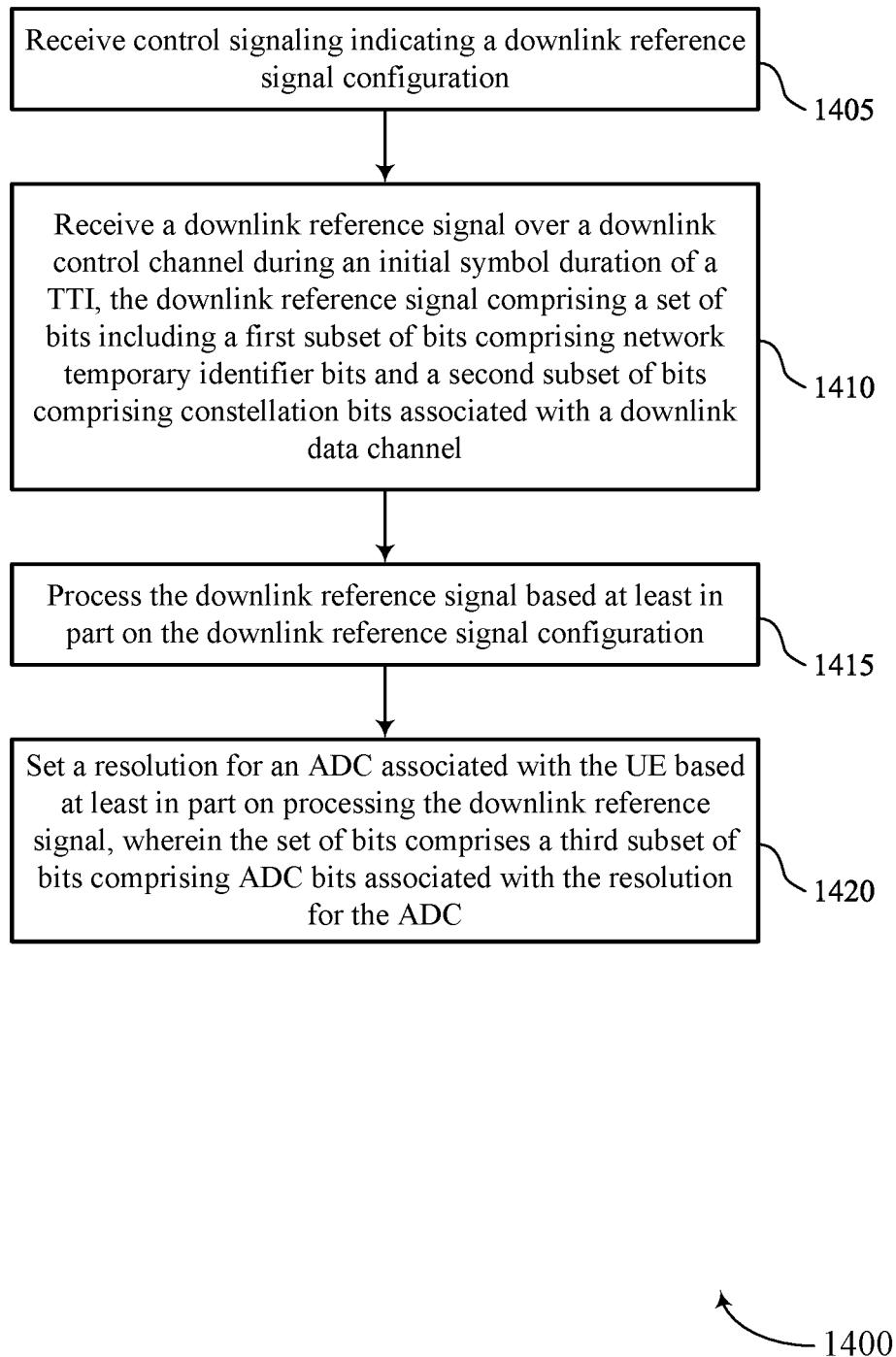

FIG. 14 shows a flowchart illustrating a method 1400 in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving control signaling indicating a downlink reference signal configuration. The operations of 1405 may be performed in accordance with examples as disclosed herein. In some examples, aspects of the operations of 1405 may be performed by a configuration component 725 as described with reference to FIG. 7.

At 1410, the method may include receiving a downlink reference signal over a downlink control channel during an initial symbol duration of a TTI, the downlink reference signal including a set of bits including a first subset of bits including network temporary identifier bits and a second subset of bits including constellation bits associated with a downlink data channel. The operations of 1410 may be performed in accordance with examples as disclosed herein.

In some examples, aspects of the operations of 1410 may be performed by a reference component 730 as described with reference to FIG. 7.

At 1415, the method may include processing the downlink reference signal based on the downlink reference signal configuration. The operations of 1415 may be performed in accordance with examples as disclosed herein. In some examples, aspects of the operations of 1415 may be performed by a downlink component 735 as described with reference to FIG. 7.

At 1420, the method may include setting a resolution for an ADC associated with the UE based on processing the downlink reference signal, where the set of bits includes a third subset of bits including ADC bits associated with the resolution for the ADC. The operations of 1420 may be performed in accordance with examples as disclosed herein. In some examples, aspects of the operations of 1420 may be performed by a resolution component 740 as described with reference to FIG. 7.

Figure 15:
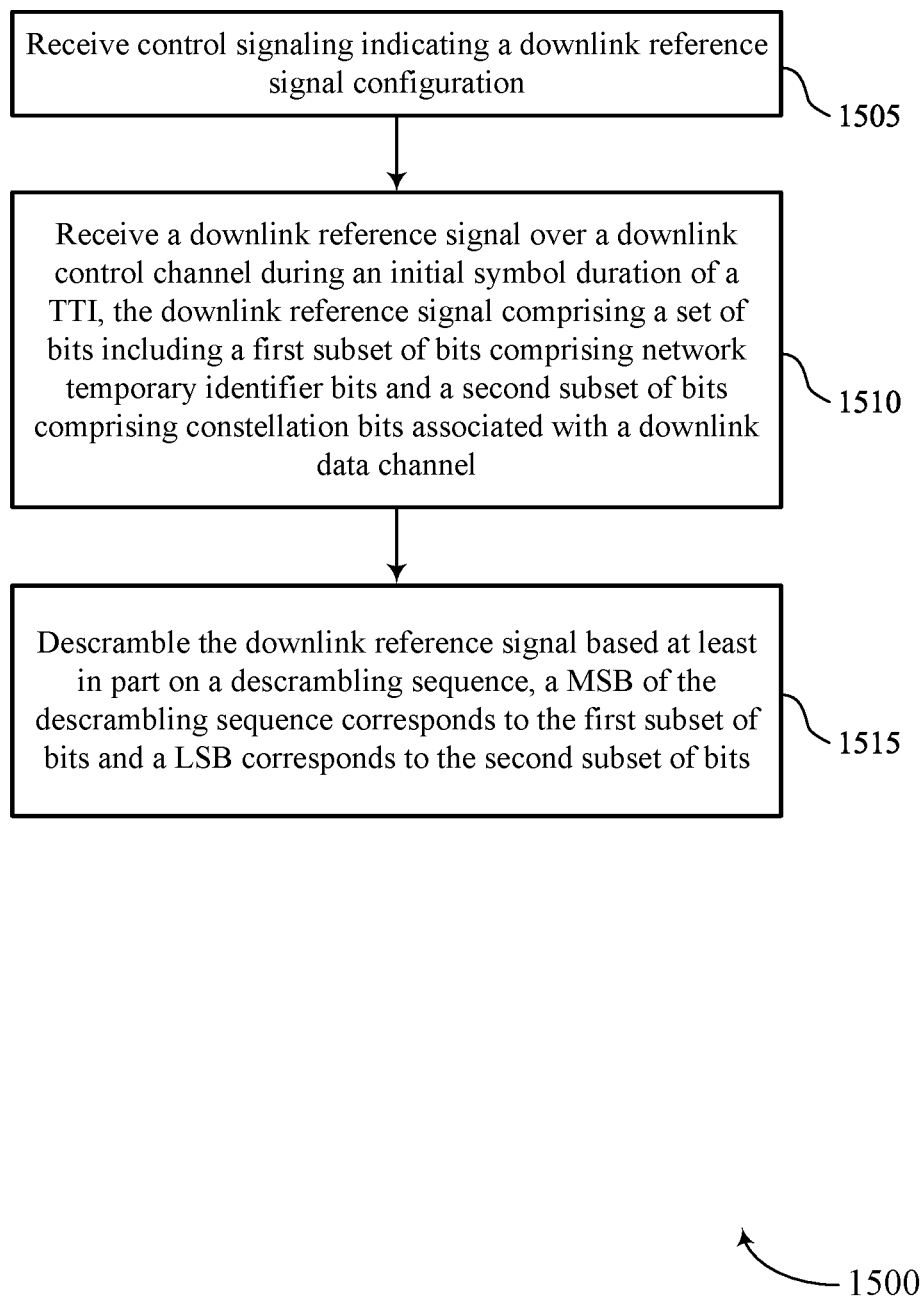

FIG. 15 shows a flowchart illustrating a method 1500 in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving control signaling indicating a downlink reference signal configuration. The operations of 1505 may be performed in accordance with examples as disclosed herein. In some examples, aspects of the operations of 1505 may be performed by a configuration component 725 as described with reference to FIG. 7.

At 1510, the method may include receiving a downlink reference signal over a downlink control channel during an initial symbol duration of a TTI, the downlink reference signal including a set of bits including a first subset of bits including network temporary identifier bits and a second subset of bits including constellation bits associated with a downlink data channel. The operations of 1510 may be performed in accordance with examples as disclosed herein. In some examples, aspects of the operations of 1510 may be performed by a reference component 730 as described with reference to FIG. 7.

At 1515, the method may include descrambling the downlink reference signal based on a descrambling sequence, a MSB of the descrambling sequence corresponds to the first subset of bits and a LSB corresponds to the second subset of bits. The operations of 1515 may be performed in accordance with examples as disclosed herein. In some examples, aspects of the operations of 1515 may be performed by a descrambler component 745 as described with reference to FIG. 7.

Figure 16:
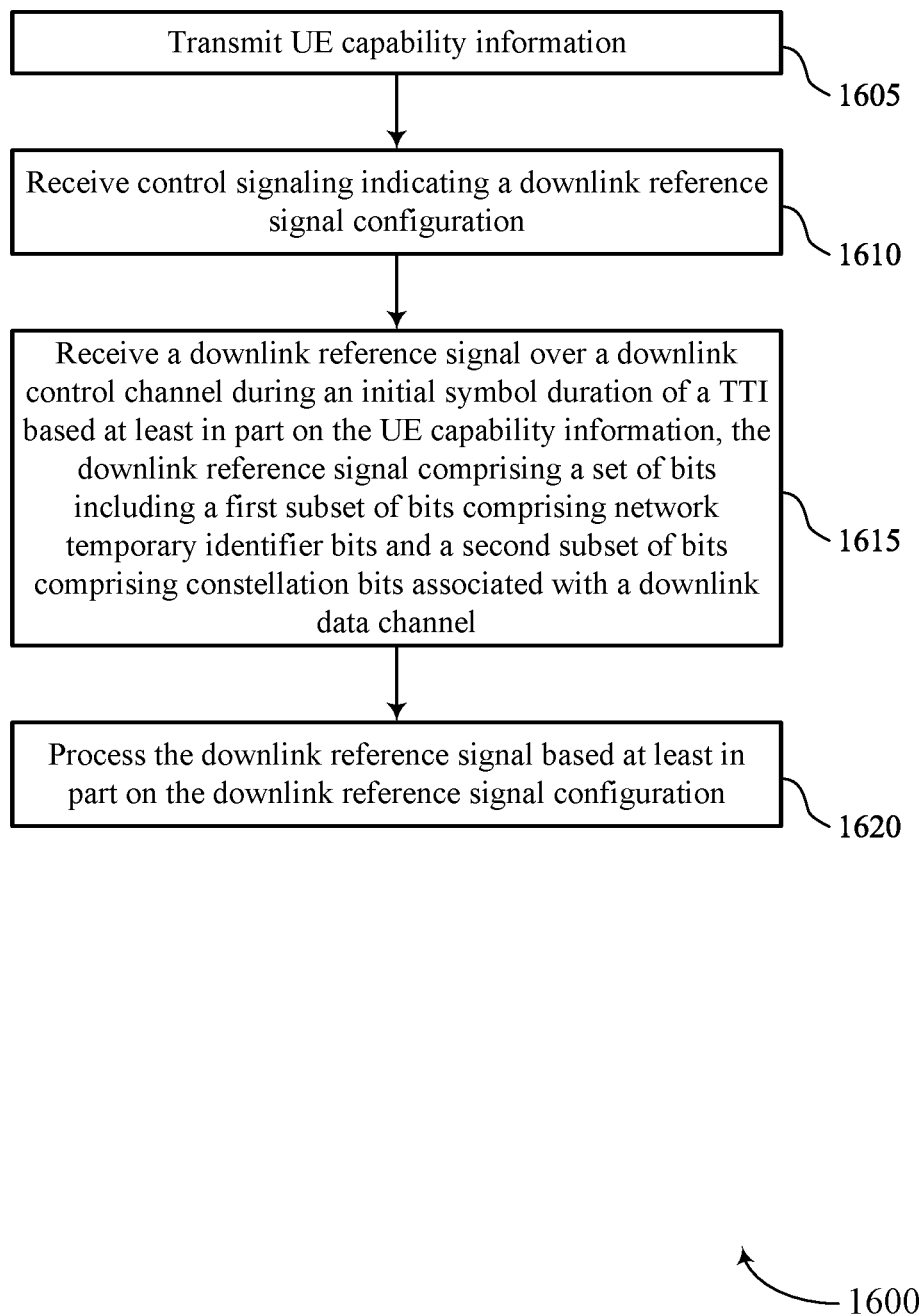

FIG. 16 shows a flowchart illustrating a method 1600 in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include transmitting UE capability information. The operations of 1605 may be performed in accordance with examples as disclosed herein. In some examples, aspects of the operations of 1605 may be performed by a capability component 750 as described with reference to FIG. 7.

At 1610, the method may include receiving control signaling indicating a downlink reference signal configuration. The operations of 1610 may be performed in accordance with examples as disclosed herein. In some examples, aspects of the operations of 1610 may be performed by a configuration component 725 as described with reference to FIG. 7.

At 1615, the method may include receiving a downlink reference signal over a downlink control channel during an initial symbol duration of a TTI based on the UE capability information, the downlink reference signal including a set of bits including a first subset of bits including network temporary identifier bits and a second subset of bits including constellation bits associated with a downlink data channel. The operations of 1615 may be performed in accordance with examples as disclosed herein. In some examples, aspects of the operations of 1615 may be performed by a reference component 730 as described with reference to FIG. 7.

At 1620, the method may include processing the downlink reference signal based on the downlink reference signal configuration. The operations of 1620 may be performed in accordance with examples as disclosed herein. In some examples, aspects of the operations of 1620 may be performed by a downlink component 735 as described with reference to FIG. 7.

Figure 17:
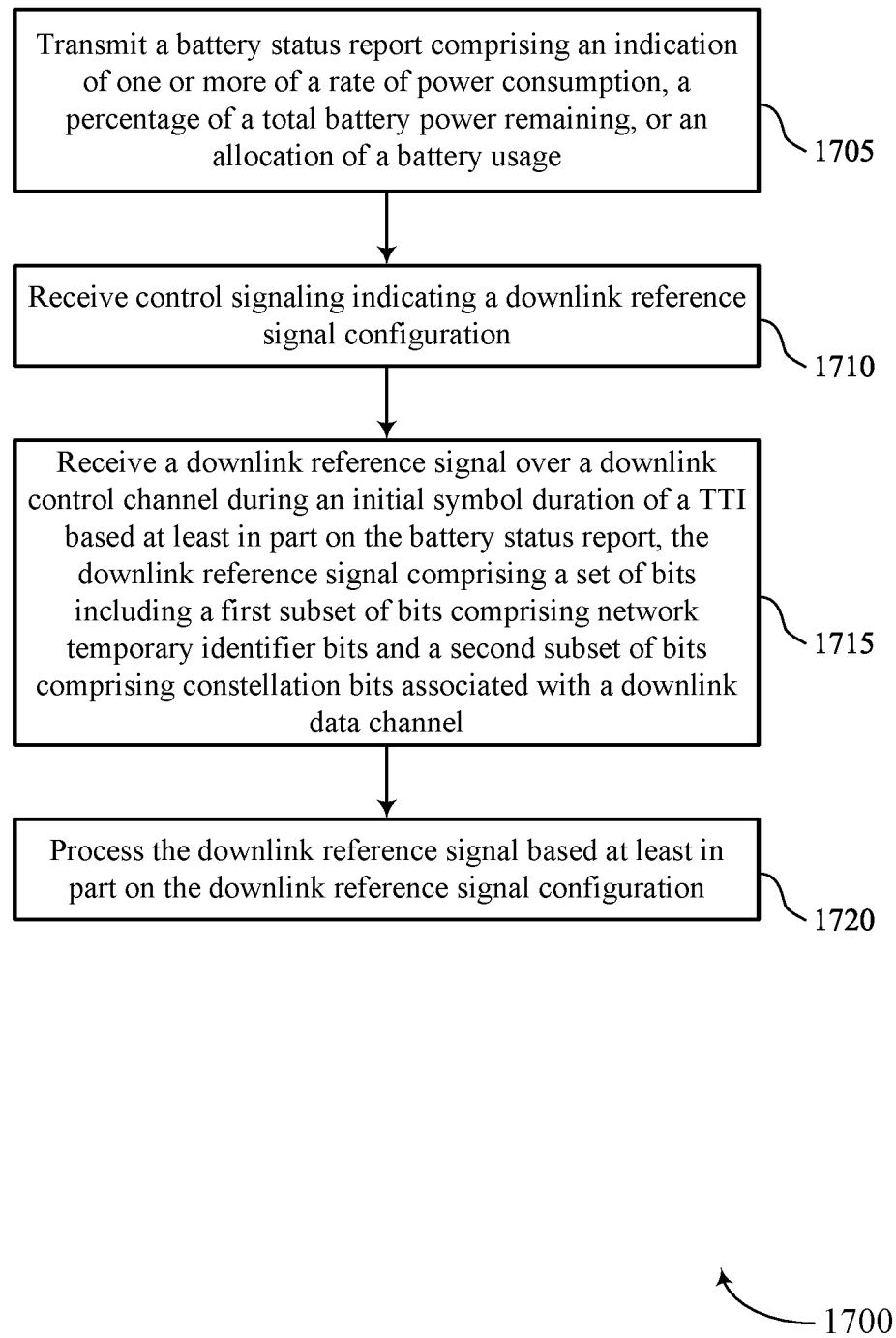

FIG. 17 shows a flowchart illustrating a method 1700 in accordance with aspects of the present disclosure. The operations of the method 1700 may be implemented by a UE or its components as described herein. For example, the operations of the method 1700 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1705, the method may include transmitting a battery status report including an indication of one or more of a rate of power consumption, a percentage of a total battery power remaining, or an allocation of a battery usage. The operations of 1705 may be performed in accordance with examples as disclosed herein. In some examples, aspects of the operations of 1705 may be performed by a report component 755 as described with reference to FIG. 7.

At 1710, the method may include receiving control signaling indicating a downlink reference signal configuration. The operations of 1710 may be performed in accordance with examples as disclosed herein. In some examples, aspects of the operations of 1710 may be performed by a configuration component 725 as described with reference to FIG. 7.

At 1715, the method may include receiving a downlink reference signal over a downlink control channel during an initial symbol duration of a TTI based on the battery status report, the downlink reference signal including a set of bits including a first subset of bits including network temporary identifier bits and a second subset of bits including constellation bits associated with a downlink data channel. The operations of 1715 may be performed in accordance with examples as disclosed herein. In some examples, aspects of the operations of 1715 may be performed by a reference component 730 as described with reference to FIG. 7.

At 1720, the method may include processing the downlink reference signal based on the downlink reference signal configuration. The operations of 1720 may be performed in accordance with examples as disclosed herein. In some examples, aspects of the operations of 1720 may be performed by a downlink component 735 as described with reference to FIG. 7.

Figure 18:
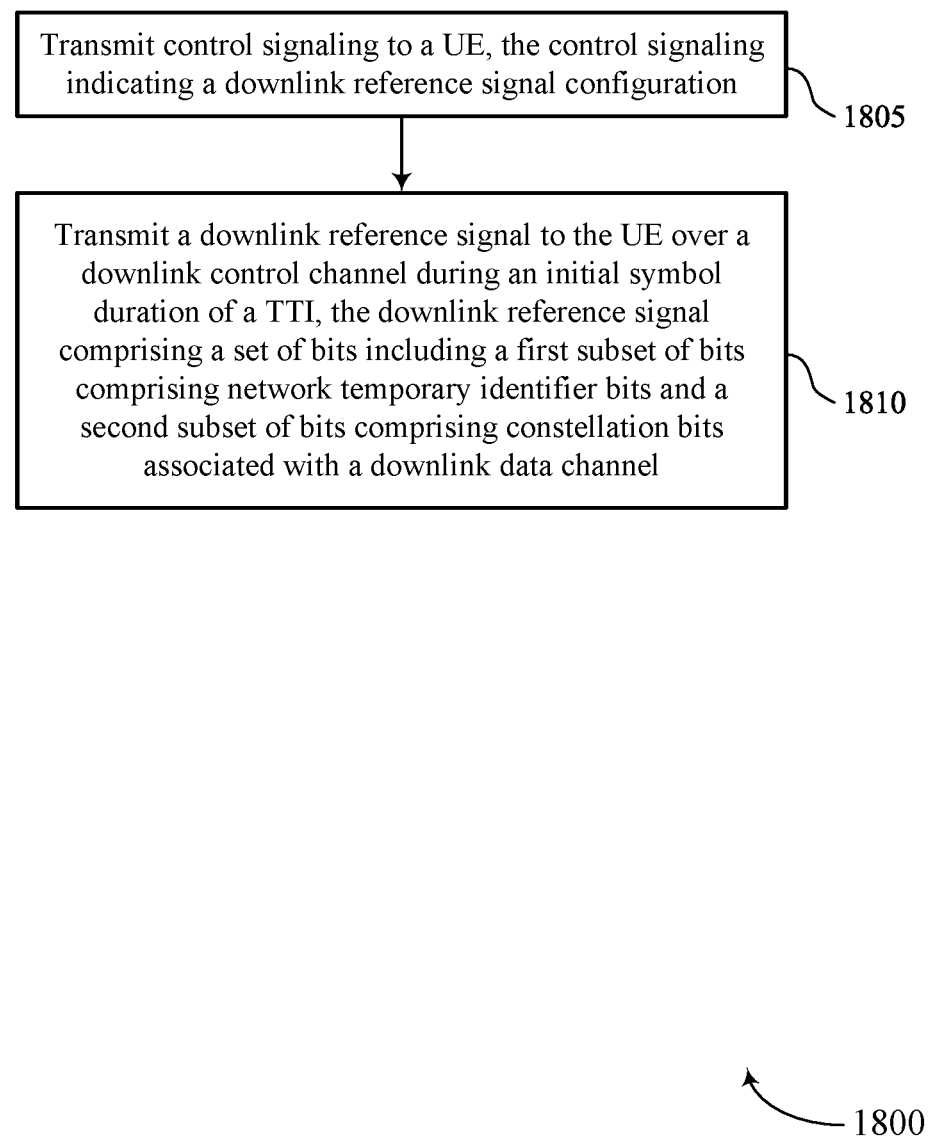

FIG. 18 shows a flowchart illustrating a method 1800 in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting control signaling to a UE, the control signaling indicating a downlink reference signal configuration. The operations of 1805 may be performed in accordance with examples as disclosed herein. In some examples, aspects of the operations of 1805 may be performed by a configuration component 1125 as described with reference to FIG. 11.

At 1810, the method may include transmitting a downlink reference signal to the UE over a downlink control channel during an initial symbol duration of a TTI, the downlink reference signal including a set of bits including a first subset of bits including network temporary identifier bits and a second subset of bits including constellation bits associated with a downlink data channel. The operations of 1810 may be performed in accordance with examples as disclosed herein. In some examples, aspects of the operations of 1810 may be performed by a reference component 1130 as described with reference to FIG. 11.

The following provides an overview of aspects of the present disclosure:

Aspect 1: A method for wireless communication at a UE, comprising: receiving control signaling indicating a downlink reference signal configuration; receiving a downlink reference signal over a downlink control channel during an initial symbol duration of a TTI, the downlink reference signal comprising a set of bits including a first subset of bits comprising network temporary identifier bits and a second subset of bits comprising constellation bits associated with a downlink data channel; and processing the downlink reference signal based at least in part on the downlink reference signal configuration.

Aspect 2: The method of aspect 1, further comprising: setting a resolution for an ADC associated with the UE based at least in part on processing the downlink reference signal, wherein the set of bits comprises a third subset of bits comprising ADC bits associated with the resolution for the ADC.

Aspect 3: The method of any of aspects 1 through 2, wherein receiving the downlink reference signal comprises: receiving a modulated downlink reference signal over the downlink control channel during the initial symbol duration of the TTI, wherein the modulated downlink reference signal comprises a set of modulated bits including the first subset of bits and the second subset of bits.

Aspect 4: The method of aspect 3, further comprising: demodulating the modulated downlink reference signal based at least in part on the downlink reference signal configuration, wherein processing the downlink reference signal is based at least in part on demodulating the modulated downlink reference signal.

Aspect 5: The method of any of aspects 1 through 4, further comprising: descrambling the downlink reference signal based at least in part on a descrambling sequence, a most significant bit of the descrambling sequence corresponds to the first subset of bits and a least significant bit corresponds to the second subset of bits, wherein processing the downlink reference signal is based at least in part on descrambling the downlink reference signal.

Aspect 6: The method of any of aspects 1 through 5, further comprising: receiving a downlink message on the downlink data channel during a symbol duration after the initial symbol duration of the TTI based at least in part on processing the downlink reference signal, wherein the downlink data channel comprises a PDSCH.

Aspect 7: The method of any of aspects 1 through 6, wherein the downlink reference signal is scrambled based at least in part on a noncoherent waveform.

Aspect 8: The method of any of aspects 1 through 7, further comprising: transmitting UE capability information, wherein receiving the downlink reference signal over the downlink control channel during the initial symbol duration of the TTI is based at least in part on the UE capability information.

Aspect 9: The method of any of aspects 1 through 8, further comprising: transmitting a battery status report comprising an indication of one or more of a rate of power consumption, a percentage of a total battery power remaining, or an allocation of a battery usage, wherein receiving the downlink reference signal over the downlink control channel during the initial symbol duration of the TTI is based at least in part on the battery status report.

Aspect 10: The method of any of aspects 1 through 9, further comprising: determining a SNR associated with the downlink reference signal, wherein receiving the downlink reference signal over the downlink control channel during the initial symbol duration of the TTI is based at least in part on the SNR associated with the downlink reference signal satisfying a threshold.

Aspect 11: The method of any of aspects 1 through 10, wherein the first subset of bits comprising the network temporary identifier bits comprises at least a portion of a network temporary identifier corresponding to the UE.

Aspect 12: The method of any of aspects 1 through 11, further comprising: determining a UE search space associated with the downlink control channel based at least in part on the downlink reference signal configuration, the UE search space corresponding to one or more of a number of candidate downlink control channel locations in a CORESET or a number of constellations, wherein receiving the downlink reference signal is based at least in part on the UE search space.

Aspect 13: The method of any of aspects 1 through 12, wherein the downlink reference signal comprises a DMRS.

Aspect 14: The method of any of aspects 1 through 13, wherein the downlink control channel comprises a PDCCH and the downlink data channel comprises a PDSCH.

Aspect 15: The method of any of aspects 1 through 14, wherein the initial symbol duration comprises an OFDM symbol.

Aspect 16: A method for wireless communication at a base station, comprising: transmitting control signaling to a UE, the control signaling indicating a downlink reference signal configuration; and transmitting a downlink reference signal to the UE over a downlink control channel during an initial symbol duration of a TTI, the downlink reference signal comprising a set of bits including a first subset of bits comprising network temporary identifier bits and a second subset of bits comprising constellation bits associated with a downlink data channel.

Aspect 17: The method of aspect 16, further comprising: modulating the downlink reference signal based at least in part on the downlink reference signal configuration, wherein the modulated downlink reference signal comprises a set of modulated bits including the first subset of bits and the second subset of bits, wherein transmitting the downlink reference signal comprises: transmitting the modulated downlink reference signal to the UE over the downlink control channel during the initial symbol duration of the TTI.

Aspect 18: The method of aspect 17, further comprising: scrambling the downlink reference signal based at least in part on a scrambling sequence, a most significant bit of the scrambling sequence corresponds to the first subset of bits and a least significant bit corresponds to the second subset of bits.

Aspect 19: The method of any of aspects 17 through 18, further comprising: transmitting a downlink message on the downlink data channel during a symbol duration after the initial symbol duration of the TTI based at least in part on processing the downlink reference signal, wherein the downlink data channel comprises a PDSCH.

Aspect 20: The method of any of aspects 17 through 19, wherein the downlink reference signal is scrambled based at least in part on a noncoherent waveform.

Aspect 21: The method of any of aspects 17 through 20, further comprising: receiving UE capability information, wherein transmitting the downlink reference signal to the UE over the downlink control channel during the initial symbol duration of the TTI is based at least in part on the UE capability information.

Aspect 22: The method of any of aspects 17 through 21, further comprising: receiving a battery status report comprising an indication of one or more of a rate of power consumption, a percentage of a total battery power remaining, or an allocation of a battery usage, wherein transmitting the downlink reference signal to the UE over the downlink control channel during the initial symbol duration of the TTI is based at least in part on the battery status report.

Aspect 23: The method of any of aspects 17 through 22, further comprising: determining a SNR associated with the downlink reference signal, wherein transmitting the downlink reference signal to the UE over the downlink control channel during the initial symbol duration of the TTI is based at least in part on the SNR satisfying a threshold.

Aspect 24: The method of any of aspects 16 through 23, wherein the first subset of bits comprising the network temporary identifier bits comprises at least a portion of a network temporary identifier corresponding to the UE.

Aspect 25: The method of any of aspects 16 through 24, wherein the downlink reference signal comprises a DMRS.

Aspect 26: The method of any of aspects 16 through 25, wherein the downlink control channel comprises a PDCCH and the downlink data channel comprises a PDSCH.

Aspect 27: The method of any of aspects 16 through 26, wherein the initial symbol duration comprises an OFDM symbol.

Aspect 28: An apparatus for wireless communication at a UE, comprising a processor; memory coupled with the processor; and instructions stored in the memory and executable by the processor to cause the apparatus to perform a method of any of aspects 1 through 15.

Aspect 29: An apparatus for wireless communication at a UE, comprising at least one means for performing a method of any of aspects 1 through 15.

Aspect 30: A non-transitory computer-readable medium storing code for wireless communication at a UE, the code comprising instructions executable by a processor to perform a method of any of aspects 1 through 15.

Aspect 31: An apparatus for wireless communication at a base station, comprising a processor; memory coupled with the processor; and instructions stored in the memory and executable by the processor to cause the apparatus to perform a method of any of aspects 16 through 27.

Aspect 32: An apparatus for wireless communication at a base station, comprising at least one means for performing a method of any of aspects 16 through 27.

Aspect 33: A non-transitory computer-readable medium storing code for wireless communication at a base station, the code comprising instructions executable by a processor to perform a method of any of aspects 16 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving control signaling indicating a downlink reference signal configuration;
   receiving a downlink reference signal over a downlink control channel during an initial symbol duration of a transmission time interval, the downlink reference signal received over the downlink control channel comprising a set of bits including a first subset of bits comprising network temporary identifier bits and a second subset of bits comprising constellation bits associated with a downlink data channel; and
   processing the downlink reference signal based at least in part on the downlink reference signal configuration.

2. The method of claim 1, further comprising:
   setting a resolution for an analog-to-digital converter associated with the UE based at least in part on processing the downlink reference signal, wherein the set of bits comprises a third subset of bits comprising analog-to-digital converter bits associated with the resolution for the analog-to-digital converter.

3. The method of claim 1, wherein receiving the downlink reference signal comprises:
   receiving a modulated downlink reference signal over the downlink control channel during the initial symbol duration of the transmission time interval,
   wherein the modulated downlink reference signal comprises a set of modulated bits including the first subset of bits and the second subset of bits.

4. The method of claim 3, further comprising:
   demodulating the modulated downlink reference signal based at least in part on the downlink reference signal configuration,
   wherein processing the downlink reference signal is based at least in part on demodulating the modulated downlink reference signal.

5. The method of claim 1, further comprising:
descrambling the downlink reference signal based at least in part on a descrambling sequence, a most significant bit of the descrambling sequence corresponds to the first subset of bits and a least significant bit corresponds to the second subset of bits,
wherein processing the downlink reference signal is based at least in part on descrambling the downlink reference signal.

6. The method of claim 1, further comprising:
receiving a downlink message on the downlink data channel during a symbol duration after the initial symbol duration of the transmission time interval based at least in part on processing the downlink reference signal, wherein the downlink data channel comprises a physical downlink shared channel.

7. The method of claim 1, wherein the downlink reference signal is scrambled based at least in part on a noncoherent waveform.

8. The method of claim 1, further comprising:
transmitting UE capability information,
wherein receiving the downlink reference signal over the downlink control channel during the initial symbol duration of the transmission time interval is based at least in part on the UE capability information.

9. The method of claim 1, further comprising:
transmitting a battery status report comprising an indication of one or more of a rate of power consumption, a percentage of a total battery power remaining, or an allocation of a battery usage,
wherein receiving the downlink reference signal over the downlink control channel during the initial symbol duration of the transmission time interval is based at least in part on the battery status report.

10. The method of claim 1, further comprising:
determining a signal-to-noise ratio associated with the downlink reference signal,
wherein receiving the downlink reference signal over the downlink control channel during the initial symbol duration of the transmission time interval is based at least in part on the signal-to-noise ratio associated with the downlink reference signal satisfying a threshold.

11. The method of claim 1, wherein the first subset of bits comprising the network temporary identifier bits comprises at least a portion of a network temporary identifier corresponding to the UE.

12. The method of claim 1, further comprising:
determining a UE search space associated with the downlink control channel based at least in part on the downlink reference signal configuration, the UE search space corresponding to one or more of a number of candidate downlink control channel locations in a control resource set or a number of constellations,
wherein receiving the downlink reference signal is based at least in part on the UE search space.

13. The method of claim 1, wherein the downlink reference signal comprises a demodulation reference signal.

14. The method of claim 1, wherein the downlink control channel comprises a physical downlink control channel and the downlink data channel comprises a physical downlink shared channel.

15. The method of claim 1, wherein the initial symbol duration comprises an orthogonal frequency division multiplexing symbol.

16. A method for wireless communication at a base station, comprising:
transmitting control signaling to a user equipment (UE), the control signaling indicating a downlink reference signal configuration; and
transmitting a downlink reference signal to the UE over a downlink control channel during an initial symbol duration of a transmission time interval, the downlink reference signal transmitted over the downlink control channel comprising a set of bits including a first subset of bits comprising network temporary identifier bits and a second subset of bits comprising constellation bits associated with a downlink data channel.

17. The method of claim 16, further comprising:
modulating the downlink reference signal based at least in part on the downlink reference signal configuration, wherein the modulated downlink reference signal comprises a set of modulated bits including the first subset of bits and the second subset of bits, wherein transmitting the downlink reference signal comprises:
transmitting the modulated downlink reference signal to the UE over the downlink control channel during the initial symbol duration of the transmission time interval.

18. The method of claim 17, further comprising:
scrambling the downlink reference signal based at least in part on a scrambling sequence, a most significant bit of the scrambling sequence corresponds to the first subset of bits and a least significant bit corresponds to the second subset of bits.

19. The method of claim 17, further comprising:
transmitting a downlink message on the downlink data channel during a symbol duration after the initial symbol duration of the transmission time interval based at least in part on processing the downlink reference signal,
wherein the downlink data channel comprises a physical downlink shared channel.

20. The method of claim 17, wherein the downlink reference signal is scrambled based at least in part on a noncoherent waveform.

21. The method of claim 17, further comprising:
receiving UE capability information,
wherein transmitting the downlink reference signal to the UE over the downlink control channel during the initial symbol duration of the transmission time interval is based at least in part on the UE capability information.

22. The method of claim 17, further comprising:
receiving a battery status report comprising an indication of one or more of a rate of power consumption, a percentage of a total battery power remaining, or an allocation of a battery usage,
wherein transmitting the downlink reference signal to the UE over the downlink control channel during the initial symbol duration of the transmission time interval is based at least in part on the battery status report.

23. The method of claim 17, further comprising:
determining a signal-to-noise ratio associated with the downlink reference signal,
wherein transmitting the downlink reference signal to the UE over the downlink control channel during the initial symbol duration of the transmission time interval is based at least in part on the signal-to-noise ratio satisfying a threshold.

24. The method of claim 16, wherein the first subset of bits comprising the network temporary identifier bits comprises at least a portion of a network temporary identifier corresponding to the UE.

25. The method of claim 16, wherein the downlink reference signal comprises a demodulation reference signal.

26. The method of claim 16, wherein the downlink control channel comprises a physical downlink control channel and the downlink data channel comprises a physical downlink shared channel.

27. The method of claim 16, wherein the initial symbol duration comprises an orthogonal frequency division multiplexing symbol.

28. An apparatus for wireless communication, comprising:
  a processor;
  memory coupled with the processor; and
  instructions stored in the memory and executable by the processor to cause the apparatus to:
    receive control signaling indicating a downlink reference signal configuration;
    receive a downlink reference signal over a downlink control channel during an initial symbol duration of a transmission time interval, the downlink reference signal received over the downlink control channel comprising a set of bits including a first subset of bits comprising network temporary identifier bits and a second subset of bits comprising constellation bits associated with a downlink data channel; and
    process the downlink reference signal based at least in part on the downlink reference signal configuration.

29. The apparatus of claim 28, wherein the instructions are further executable by the processor to cause the apparatus to:
  set a resolution for an analog-to-digital converter associated with the apparatus based at least in part on processing the downlink reference signal, wherein the set of bits comprises a third subset of bits comprising analog-to-digital converter bits associated with the resolution for the analog-to-digital converter.

30. An apparatus for wireless communication, comprising:
  a processor;
  memory coupled with the processor; and
  instructions stored in the memory and executable by the processor to cause the apparatus to:
    transmit control signaling to a user equipment (UE), the control signaling indicating a downlink reference signal configuration; and
    transmit a downlink reference signal to the UE over a downlink control channel during an initial symbol duration of a transmission time interval, the downlink reference signal transmitted over the downlink control channel comprising a set of bits including a first subset of bits comprising network temporary identifier bits and a second subset of bits comprising constellation bits associated with a downlink data channel.

* * * * *